US010462469B2

(12) United States Patent
Hendry et al.

(10) Patent No.: US 10,462,469 B2
(45) Date of Patent: *Oct. 29, 2019

(54) METHOD FOR ENCODING VIDEO, METHOD FOR DECODING VIDEO, AND APPARATUS USING SAME

(71) Applicant: LG ELECTRONICS INC., Seoul (KR)

(72) Inventors: Hendry Hendry, Seoul (KR); Joonyoung Park, Seoul (KR); Chulkeun Kim, Seoul (KR); Byeongmoon Jeon, Seoul (KR); Jungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,379

(22) Filed: Sep. 20, 2018

(65) Prior Publication Data
US 2019/0028712 A1 Jan. 24, 2019

Related U.S. Application Data

(63) Continuation of application No. 14/649,825, filed as application No. PCT/KR2013/011671 on Dec. 16, 2013, now Pat. No. 10,116,940.
(Continued)

(51) Int. Cl.
H04N 19/159 (2014.01)
H04N 19/30 (2014.01)
(Continued)

(52) U.S. Cl.
CPC ......... H04N 19/159 (2014.11); H04N 19/105 (2014.11); H04N 19/172 (2014.11);
(Continued)

(58) Field of Classification Search
CPC .. H04N 19/159; H04N 19/577; H04N 19/187; H04N 19/573; H04N 19/33;
(Continued)

(56) References Cited

U.S. PATENT DOCUMENTS

2007/0086521 A1 4/2007 Wang et al.
2009/0147857 A1 6/2009 Park et al.
(Continued)

FOREIGN PATENT DOCUMENTS

CN 101317459 A 12/2008
CN 101352044 A 1/2009
(Continued)

OTHER PUBLICATIONS

XP030055424 (JCTVC-K0345r3): Joint Collaborative Team on Video Coding of ITU-T SG16 WP3, 11th Meeting: Shanghai, CN, Oct. 10-19, 2012, "Suggested design of initial software model for scalable HEVC extension proposal by Fraunhofer HHI, Vidyo and Samsung" by Thomas Wiegand.
(Continued)

Primary Examiner — On S Mung
(74) Attorney, Agent, or Firm — Dentons US LLP

(57) ABSTRACT

The present invention relates to a method for coding a scalable video in a multilayer structure, and a method for encoding a video according to the present invention comprises the steps of: decoding and saving a picture of a reference layer; inducing an interlayer reference picture which is referenced for predicting a current block of a current layer; producing a reference picture list including the interlayer reference picture and a reference picture of the current layer; conducting a prediction on the current block of the current layer with the reference picture list to induce a prediction sample with respect to the current block; inducing a recovery sample with respect to the current block based on the prediction sample and the prediction block with respect to the current block; and transmitting reference information for indicating a picture that can be used for interlayer prediction from the pictures of the reference layer.

11 Claims, 10 Drawing Sheets

Related U.S. Application Data

(60) Provisional application No. 61/810,232, filed on Apr. 9, 2013, provisional application No. 61/804,592, filed on Mar. 22, 2013, provisional application No. 61/803,084, filed on Mar. 18, 2013, provisional application No. 61/753,879, filed on Jan. 17, 2013, provisional application No. 61/749,401, filed on Jan. 7, 2013, provisional application No. 61/737,112, filed on Dec. 14, 2012.

(51) Int. Cl.
| | |
|---|---|
| *H04N 19/503* | (2014.01) |
| *H04N 19/172* | (2014.01) |
| *H04N 19/176* | (2014.01) |
| *H04N 19/105* | (2014.01) |
| *H04N 19/46* | (2014.01) |
| *H04N 19/463* | (2014.01) |
| *H04N 19/187* | (2014.01) |
| *H04N 19/33* | (2014.01) |
| *H04N 19/573* | (2014.01) |
| *H04N 19/577* | (2014.01) |

(52) U.S. Cl.
CPC ......... *H04N 19/176* (2014.11); *H04N 19/187* (2014.11); *H04N 19/30* (2014.11); *H04N 19/33* (2014.11); *H04N 19/46* (2014.11); *H04N 19/463* (2014.11); *H04N 19/503* (2014.11); *H04N 19/573* (2014.11); *H04N 19/577* (2014.11)

(58) Field of Classification Search
CPC .... H04N 19/463; H04N 19/46; H04N 19/105; H04N 19/176; H04N 19/172; H04N 19/503; H04N 19/30
USPC .................................................. 375/240.12
See application file for complete search history.

(56) References Cited

U.S. PATENT DOCUMENTS

| | | |
|---|---|---|
| 2010/0034258 A1 | 2/2010 | Pandit et al. |
| 2010/0135385 A1 | 6/2010 | Park et al. |
| 2014/0003528 A1 | 1/2014 | Tourapis |
| 2015/0312580 A1* | 10/2015 | Hannuksela ........... H04N 19/70 375/240.02 |

FOREIGN PATENT DOCUMENTS

| | | |
|---|---|---|
| JP | 2007-043719 A | 2/2007 |
| JP | 2009-512306 | 3/2009 |
| JP | 2009-512306 A | 3/2009 |
| JP | 2009-538084 A | 10/2009 |
| KR | 10-2007-0000022 A | 1/2007 |
| KR | 10-2011-0123291 A | 11/2011 |
| WO | 2007040335 A1 | 4/2007 |
| WO | 2008-030067 A1 | 3/2008 |

OTHER PUBLICATIONS

JCTCV-K0264: Joint Collaborative Team on Video Coding of ITU-T SG16 WP3, 11th Meeting: Shanghai, CN, Oct. 10-19, 2012, "Hierarchical inter-layer prediction in multi-loop scalable extension of HEVC" by Do-Kyoung Kwon.

* cited by examiner

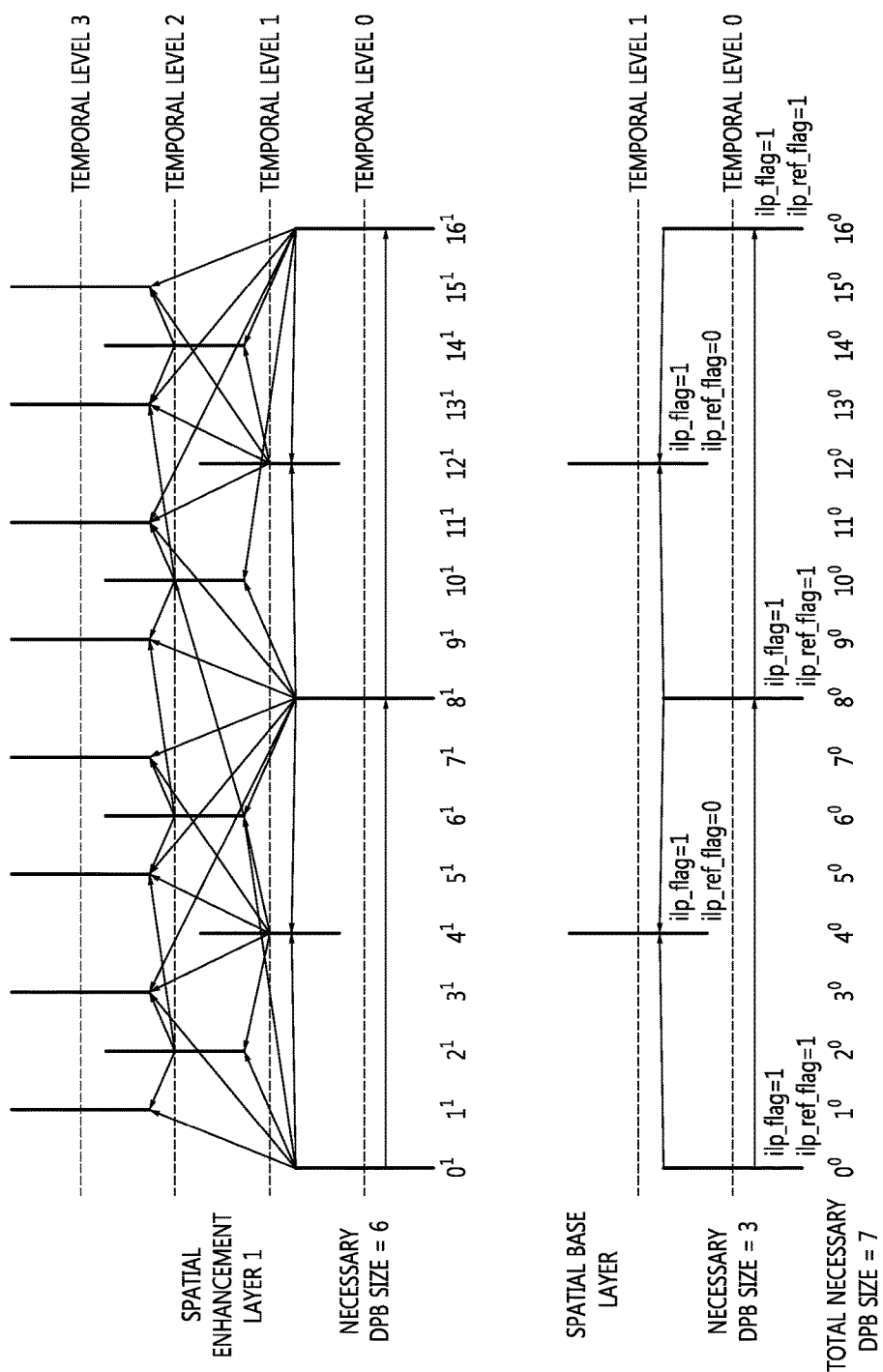

FIG. 8

$0^0$                                                    #pics in DPB:1

$0^0$ $0^1$                                       #pics in DPB:2

$0^0$ $0^1$ $8^0$                                 #pics in DPB:3

$0^0$ $0^1$ $8^0$ $8^1$                           #pics in DPB:4

$0^0$ $0^1$ $8^0$ $8^1$ $4^0$                     #pics in DPB:5

$\cancel{0^0}$ $0^1$ $8^0$ $8^1$ $4^0$ $4^1$                #pics in DPB:5

$\cancel{0^0}$ $0^1$ $8^0$ $8^1$ $\cancel{4^0}$ $4^1$ $2^1$          #pics in DPB:5

$\cancel{0^0}$ $0^1$ $8^0$ $8^1$ $\cancel{4^0}$ $4^1$ $2^1$ $1^1$     #pics in DPB:6

$\cancel{0^0}$ $0^1$ $8^0$ $8^1$ $\cancel{4^0}$ $4^1$ $2^1$ $\cancel{1^1}$ $3^1$   #pics in DPB:6

$\cancel{0^0}$ $0^1$ $8^0$ $8^1$ $\cancel{4^0}$ $4^1$ $2^1$ $\cancel{1^1}$ $\cancel{3^1}$ $6^1$   #pics in DPB:6

$\cancel{0^0}$ $\cancel{0^1}$ $8^0$ $8^1$ $\cancel{4^0}$ $4^1$ $2^1$ $\cancel{1^1}$ $\cancel{3^1}$ $6^1$ $5^1$   #pics in DPB:6

$\cancel{0^0}$ $\cancel{0^1}$ $8^0$ $8^1$ $\cancel{4^0}$ $4^1$ $\cancel{2^1}$ $\cancel{1^1}$ $\cancel{3^1}$ $6^1$ $\cancel{5^1}$ $7^1$   #pics in DPB:5

$\cancel{0^0}$ $\cancel{0^1}$ $8^0$ $8^1$ $\cancel{4^0}$ $4^1$ $\cancel{2^1}$ $\cancel{1^1}$ $\cancel{3^1}$ $6^1$ $\cancel{5^1}$ $\cancel{7^1}$ $16^0$   #pics in DPB:5

$\cancel{0^0}$ $\cancel{0^1}$ $\cancel{8^0}$ $8^1$ $\cancel{4^0}$ $4^1$ $\cancel{2^1}$ $\cancel{1^1}$ $\cancel{3^1}$ $6^1$ $\cancel{5^1}$ $\cancel{7^1}$ $16^0$ $16^1$   #pics in DPB:5

$\cancel{0^0}$ $\cancel{0^1}$ $\cancel{8^0}$ $8^1$ $\cancel{4^0}$ $4^1$ $\cancel{2^1}$ $\cancel{1^1}$ $\cancel{3^1}$ $6^1$ $\cancel{5^1}$ $\cancel{7^1}$ $16^0$ $16^1$ $12^0$   #pics in DPB:6

$\cancel{0^0}$ $\cancel{0^1}$ $\cancel{8^0}$ $8^1$ $\cancel{4^0}$ $4^1$ $\cancel{2^1}$ $\cancel{1^1}$ $\cancel{3^1}$ $6^1$ $\cancel{5^1}$ $\cancel{7^1}$ $16^0$ $16^1$ $12^0$ $12^1$   #pics in DPB:7

$\cancel{0^0}$ $\cancel{0^1}$ $\cancel{8^0}$ $8^1$ $\cancel{4^0}$ $4^1$ $\cancel{2^1}$ $\cancel{1^1}$ $\cancel{3^1}$ $6^1$ $\cancel{5^1}$ $\cancel{7^1}$ $16^0$ $16^1$ $\cancel{12^0}$ $12^1$ $10^1$   #pics in DPB:7

$\cancel{0^0}$ $\cancel{0^1}$ $\cancel{8^0}$ $8^1$ $\cancel{4^0}$ $\cancel{4^1}$ $\cancel{2^1}$ $\cancel{1^1}$ $\cancel{3^1}$ $6^1$ $\cancel{5^1}$ $\cancel{7^1}$ $16^0$ $16^1$ $\cancel{12^0}$ $12^1$ $10^1$ $9^1$   #pics in DPB:7

$\cancel{0^0}$ $\cancel{0^1}$ $\cancel{8^0}$ $8^1$ $\cancel{4^0}$ $\cancel{4^1}$ $\cancel{2^1}$ $\cancel{1^1}$ $\cancel{3^1}$ $6^1$ $\cancel{5^1}$ $\cancel{7^1}$ $16^0$ $16^1$ $\cancel{12^0}$ $12^1$ $10^1$ $\cancel{9^1}$ $11^1$   #pics in DPB:7

$\cancel{0^0}$ $\cancel{0^1}$ $\cancel{8^0}$ $8^1$ $\cancel{4^0}$ $\cancel{4^1}$ $\cancel{2^1}$ $\cancel{1^1}$ $\cancel{3^1}$ $\cancel{6^1}$ $\cancel{5^1}$ $\cancel{7^1}$ $16^0$ $16^1$ $\cancel{12^0}$ $12^1$ $10^1$ $\cancel{9^1}$ $\cancel{11^1}$ $14^1$   #pics in DPB:6

$\cancel{0^0}$ $\cancel{0^1}$ $\cancel{8^0}$ $\cancel{8^1}$ $\cancel{4^0}$ $\cancel{4^1}$ $\cancel{2^1}$ $\cancel{1^1}$ $\cancel{3^1}$ $\cancel{6^1}$ $\cancel{5^1}$ $\cancel{7^1}$ $16^0$ $16^1$ $\cancel{12^0}$ $12^1$ $10^1$ $\cancel{9^1}$ $\cancel{11^1}$ $14^1$ $\cancel{13^1}$   #pics in DPB:6

$\cancel{0^0}$ $\cancel{0^1}$ $\cancel{8^0}$ $\cancel{8^1}$ $\cancel{4^0}$ $\cancel{4^1}$ $\cancel{2^1}$ $\cancel{1^1}$ $\cancel{3^1}$ $\cancel{6^1}$ $\cancel{5^1}$ $\cancel{7^1}$ $16^0$ $16^1$ $\cancel{12^0}$ $12^1$ $10^1$ $\cancel{9^1}$ $\cancel{11^1}$ $14^1$ $\cancel{13^1}$ $15^1$   #pics in DPB:6

METHOD FOR ENCODING VIDEO, METHOD FOR DECODING VIDEO, AND APPARATUS USING SAME

This application is a continuation of U.S. patent application Ser. No. 14/649,825 filed on Jun. 4, 2015, now allowed, which is a U.S. National Phase Application under 35 U.S.C. § 371 of International Application PCT/KR2013/011671 filed on Dec. 16, 2013, which claims the benefit of U.S. Provisional Application No. 61/737,112 filed on Dec. 14, 2012, U.S. Provisional Application No. 61/749,401 filed on Jan. 7, 2013, U.S. Provisional Application No. 61/753,879 filed on Jan. 17, 2013, U.S. Provisional Application No. 61/803,084 filed on Mar. 18, 2013, U.S. Provisional Application No. 61/804,592 filed on Mar. 22, 2013 and U.S. Provisional Application No. 61/810,232 filed on Apr. 9, 2013, the entire content of the prior applications is hereby incorporated by reference.

TECHNICAL FIELD

The present invention relates to video encoding and video decoding, and more particularly, to a method and an apparatus for reconstructing a picture to be encoded/decoded in a current layer based on information on another layer in a multilayer structure.

BACKGROUND ART

Recently, demands for high-resolution and high-quality pictures have increased in various fields of applications. As pictures have higher resolution and higher quality, the amount of information on the pictures also increases.

With a growing amount of information, multi-functional devices and networks with various environments are introduced. Accordingly, the same content may be utilized with different levels of quality.

Specifically, as terminals are able to support diverse qualities of pictures and various network environments are established, a picture with general quality is enabled in one environment while a higher-quality picture may be available in another environment.

For example, a user may enjoy video content purchased through a portable terminal on a large-screen display with higher resolution at home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands. Further, discussions on various video processing methods involved in scalability are also necessary.

SUMMARY OF THE INVENTION

Technical Problems

An object of the invention is to provide a method and an apparatus for performing effective inter-layer prediction in scalable video coding of a multilayer structure.

Another object of the invention is to provide a method and an apparatus for performing selective processing on pictures in a reference layer for inter-layer prediction in scalable video coding of a multilayer structure.

Still another object of the invention is to provide a method and an apparatus for specifying reference pictures for a current layer among pictures in a reference layer for inter-layer prediction in scalable video coding of a multilayer structure.

Yet another object of the invention is to provide a method and an apparatus for effectively performing inter-layer prediction based on pictures in a reference layer specified for inter-layer prediction in scalable video coding of a multilayer structure.

Technical Solution

According to an aspect of the invention, there is provided a method of encoding scalable video in multi-layer structure, comprising deriving an inter-layer reference picture which is referred to in prediction of a current block in a current layer from the decoded picture in the reference layer, constructing a reference picture list comprising the inter-layer reference picture and a reference picture in the current layer, deriving a predicted sample of the current block by predicting the current block in the current layer based on the reference picture list, deriving a reconstructed sample of the current block based on the predicted sample and a predicted block of the current block, and transmitting reference information indicating a picture available for inter-layer prediction among pictures in the reference layer.

According to an another aspect of the invention, there is provided a method of decoding scalable video in multi-layer structure, comprising receiving reference information indicating whether a picture in a reference layer is available for inter-layer prediction, decoding and storing the picture in the reference layer based on the reference information, deriving an inter-layer reference picture referred to in prediction of a current block in a current layer from the decoded picture in the reference layer based on the reference information, constructing a reference picture list comprising the inter-layer reference picture and a reference picture in the current layer, deriving a predicted sample of the current block by predicting the current block in the current layer based on the reference picture list, and deriving a reconstructed sample of the current block based on the predicted sample and a residual sample of the current block.

Advantageous Effects

According to the present invention, effective inter-layer prediction may be performed in scalable video coding of a multilayer structure.

According to the present invention, selective processing may be performed on pictures in a reference layer for inter-layer prediction in scalable video coding of a multilayer structure.

According to the present invention, reference pictures for a current layer may be specified among pictures in a reference layer for inter-layer prediction in scalable video coding of a multilayer structure.

According to the present invention, inter-layer prediction may effectively be performed based on pictures in a reference layer specified for inter-layer prediction in scalable video coding of a multilayer structure.

BRIEF DESCRIPTION OF THE DRAWINGS

FIG. 7 schematically illustrates a case in which pictures not needed for decoding are excluded in the example of FIG. 6.

FIG. 8 schematically illustrates an example of content/memory state/DPB state in decoding each picture.

DESCRIPTION OF EMBODIMENTS

Figure 1:
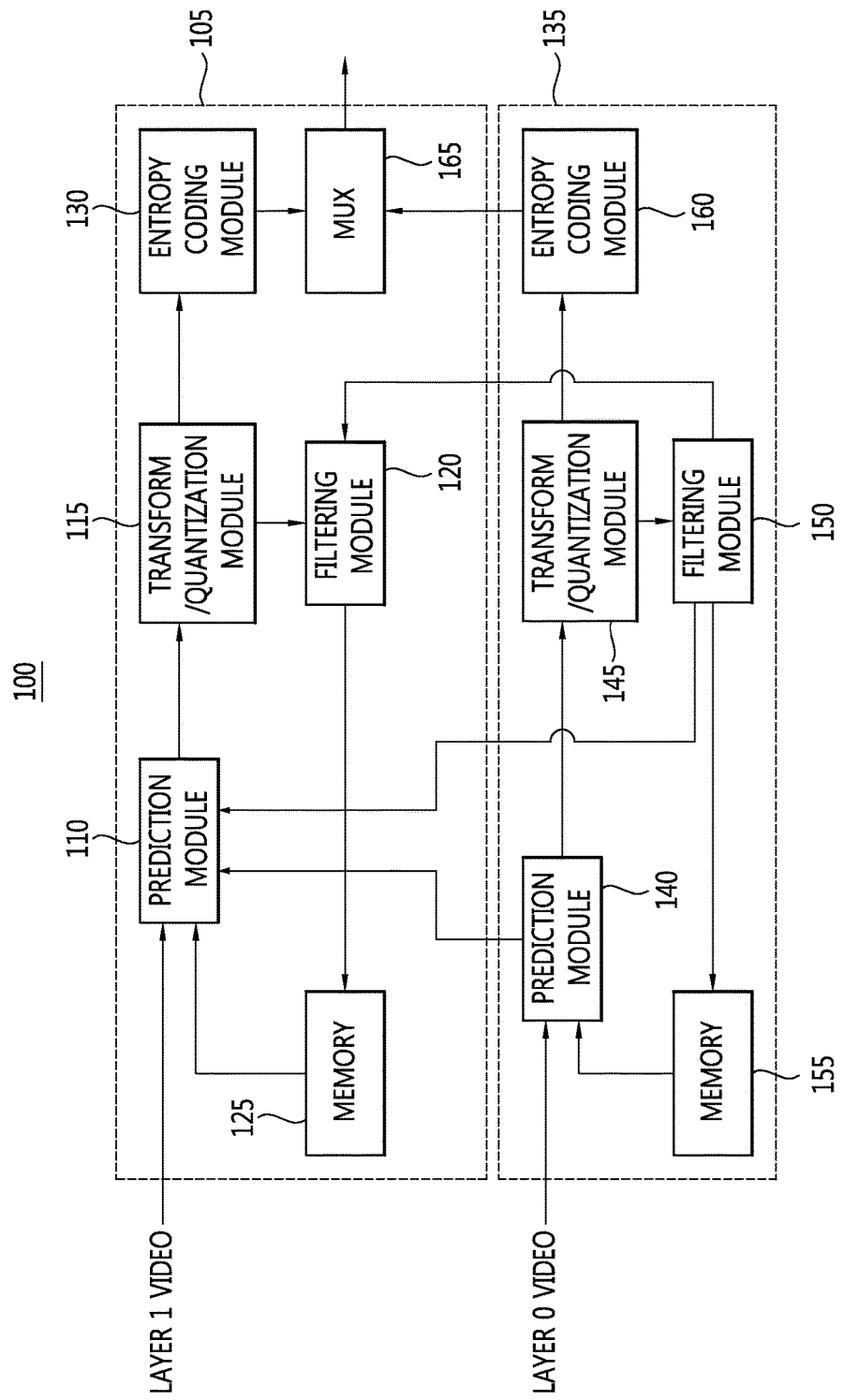
FIG. 1 is a block diagram schematically illustrating a video encoder that supports scalability according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

In a video coding method that supports scalability (hereinafter, referred to as "scalable coding"), input signals can be processed by layers. Depending on the layers, the input signals (input videos) may be different from each other in at least one of a resolution, a frame rate, a bit depth, a color format, and an aspect ratio.

In this description, scalable coding includes scalable encoding and scalable decoding.

In scalable encoding/decoding, it is possible to reduce duplicate transmission/processing of information and to enhance compression efficiency by performing inter-layer prediction using an inter-layer difference, that is, on the basis of scalability.

FIG. 1 is a block diagram schematically illustrating a video encoder that supports scalability according to an embodiment of the invention.

FIG. 1 illustrates a multilayer structure including two layers for convenience of description. However, the present invention is not limited thereto and a multilayer structure according to the present invention may include two or more layers.

Referring to FIG. 1, the video encoder 100 includes an encoding module 105 for layer 1 and an encoding module 135 for layer 0.

Layer 0 may be a base layer, a reference layer or a lower layer, and layer 1 may be an enhancement layer, a current layer or an upper layer.

The encoding module 105 for layer 1 includes a prediction module 110, a transform/quantization module 115, a filtering module 120, a decoded picture buffer (DPB) 125, an entropy coding module 130, and a multiplexer (MUX) 165.

The encoding module 135 for layer 0 includes a prediction module 140, a transform/quantization module 145, a filtering module 150, a DPB 155, and an entropy coding module 160.

The prediction modules 110 and 140 may perform inter prediction and intra prediction on an input video. The prediction modules 110 and 140 may perform the predictions by predetermined processing units. The processing unit for prediction may be a coding unit (CU), a prediction unit (PU), or may be a transform unit (TU).

For example, the prediction modules 110 and 140 may determine whether to conduct inter prediction or intra prediction by CU, may determine a prediction mode by PU, and may perform prediction by PU or TU. Prediction to be performed includes construction of a predicted block and construction of a residual block (residual signal).

In the inter prediction, the prediction may be performed on the basis of information on at least one of a previous picture and/or a subsequent picture of a current picture to construct a predicted block. In the intra prediction, the prediction may be performed on the basis of information on a pixel in a current picture to construct a predicted block.

Examples of an inter prediction mode or method include a skip mode, a merge mode, a motion vector prediction (MVP) method. In the inter prediction, a reference picture for a current PU to be predicted may be selected and a reference block corresponding to the current PU may be selected from the reference picture. The prediction modules 110 and 140 may construct a predicted block on the basis of the reference block.

The predicted block may be constructed as an integer sample unit or as a fractional pixel unit. Here, a motion vector may also be represented in a fractional pixel.

Motion information in the inter prediction, that is, information such as an index, a motion vector and a residual signal of a reference picture, is entropy-encoded and is transmitted to a video decoder. When a skip mode is applied, the residual signal may not be created, transformed, quantized, and transmitted at all.

Prediction modes in the intra prediction may include 33 directional prediction modes and at least two non-directional modes. The non-directional modes may include a DC prediction mode and a planar mode. In the intra prediction, a predicted block may be constructed after a filter is applied to a reference sample.

A PU may be a block with various sizes and shapes. For example, in inter prediction, a PU may be a 2N×2N, 2N×N, N×2N or N×N block (where N is an integer). In intra prediction, a PU may be a 2N×2N or N×N block (where N is an integer). A PU with a size of N×N may be set to be applied only to a specific case. For example, the PU with the size of N×N may be set to be used only for a smallest CU or only for intra prediction. In addition to the PUs with the above-mentioned sizes, a PU may be further defined as an N×mN block, an mN×N block, a 2N×mN block, or an mN×2N block (where m<1) for use.

The prediction modules 110 may perform prediction for layer 1 using information on layer 0. In this specification, a process of predicting current layer information using another layer information is defined as an inter-layer prediction for convenience.

The current layer information predicted using the other layer information (that is, predicted by the inter-layer prediction) may include at least one selected from a texture, motion information, unit information, a predetermined parameter (for example, a filtering parameter).

The other layer information used for predicting the current layer information (that is, used for the inter-layer prediction) may include at least one selected form a texture, motion information, unit information, a predetermined parameter (for example, a filtering parameter).

In inter-layer prediction, a current block is a block in a current picture in a current layer (layer 1 in FIG. 1), which may be a block to be encoded. A reference block is a block in a picture (reference picture) belonging to the same access unit (AU) as the picture (current picture) including the current block, which may be a block corresponding to the current block in a layer (reference layer, layer 0 in FIG. 1) which is referred to in prediction of the current block.

An example of inter-layer prediction includes inter-layer motion prediction which predicts motion information on a current layer using motion information on a reference layer. According to inter-layer motion prediction, motion information on a current block may be predicted using motion information on a reference block.

When inter-layer motion prediction is applied, the prediction module 110 may scale and use motion information on a reference layer.

As another example of inter-layer prediction, inter-layer texture prediction may use a texture of a reconstructed reference block as the predictive value of a current block. Here, the prediction module 110 may scale the texture of the reference block by upsampling.

As still another example of inter-layer prediction, inter-layer unit information prediction may derive unit (CU, PU and/or TU) information on a reference layer to use as unit information on a current layer, or determine unit information on the current layer based on unit information on the reference layer.

Unit information may include information in each unit level. For instance, CU information may include information on partition (CU, PU and/or TU), information on transformation, information on prediction, and information on coding. PU information may include information on PU partition and information on prediction (for example, motion information and information on a prediction mode). TU information may include information on TU partition and information on transformation (transform coefficients and transform methods).

As yet another example of inter-layer prediction, inter-layer parameter prediction may reuse a derived parameter of a reference layer for a current layer or predict a parameter for the current layer based on the parameter used for the reference layer.

As still another example of inter-layer prediction, inter-layer residual prediction may predict a residual of a current layer using residual information on another layer and predict a current block based on the residual of the current layer.

As yet another example of inter-layer prediction, inter-layer differential prediction may predict a current block using a differential between pictures obtained by upsampling or downsampling a reconstructed picture in a current layer and a reconstructed picture in a reference layer.

As still another example of inter-layer prediction, inter-layer syntax prediction may predict or generate a texture of a current block using syntax information on a reference layer. Here, the syntax information on the reference layer used for reference may include information on an intra prediction mode, motion information and the like.

A plurality of inter-layer prediction methods among the afore-described methods may be used in prediction of a particular block.

Although inter-layer texture prediction, inter-layer motion prediction, inter-layer unit information prediction, inter-layer parameter prediction, inter-layer residual prediction, inter-layer differential prediction, and inter-layer syntax prediction have been described as examples of inter-layer prediction, inter-layer prediction applicable to the present invention is not limited thereto.

For instance, inter-layer prediction may be applied as an extension of inter prediction for a current layer. That is, a reference picture derived from a reference layer may be included in reference pictures available for reference in inter prediction of a current block to conduct inter prediction of the current block.

In this case, an inter-layer reference picture may be included in a reference picture list for the current block. The prediction module 110 may perform inter prediction of the current block using the inter-layer reference picture.

Here, the inter-layer reference picture may be a reference picture constructed by sampling a reconstructed picture in the reference layer to correspond to the current layer. Thus, when the reconstructed picture in the reference layer corresponds to a picture in the current layer, the reconstructed picture in the reference layer may be used as an inter-layer reference picture without sampling. For instance, when samples of the reconstructed picture in the reference layer and the reconstructed picture in the current layer have the same width and height and offsets between the picture in the reference layer and the picture in the current layer at the top left, top right, bottom left and bottom right are 0, the reconstructed picture in the reference layer may be used as an inter-layer reference picture for the current layer without being subjected to sampling.

The reconstructed picture in the reference layer from which the inter-layer reference picture is derived may belong to the same AU as the current picture to be encoded.

When inter prediction of the current block is performed with the reference picture list including the inter-layer reference picture, the position of the inter-layer reference picture in the reference picture list may vary in reference picture lists L0 and L1. For instance, in reference picture list L0, the inter-layer reference picture may be positioned subsequent to short-term reference pictures prior to the current picture. In reference picture list L1, the inter-layer reference picture may be positioned last.

Here, reference picture list L0 is a reference picture list used for inter prediction of a predictive slice ("P slice") or used as a first reference picture list in inter prediction of a bi-predictive slice ("B slice"). Reference picture list L1 is a second reference picture list used in inter prediction of the B slice.

Thus, reference picture list L0 may be constructed by sequentially including short-term reference picture(s) prior to the current picture, the inter-layer reference picture, short-term reference picture(s) subsequent to the current picture, and a long-term reference picture. Reference picture list L1 may be constructed by sequentially including short-term reference picture(s) subsequent to the current picture, short-term reference picture(s) prior to the current picture, a long-term reference picture, and the inter-layer reference picture.

Here, a P slice is a slice to be subjected to intra prediction or to inter prediction using at most one motion vector per prediction block and a reference picture index. A B slice is a slice to be subjected to intra prediction or to prediction using at most two motion vectors per prediction block and a reference picture index. Further, an intra slice ("I slice") is a slice subjected only to intra prediction.

A slice is a sequence of one or more slice segments. A slice sequence starts from an independent slice segment. When dependent slice segments preceding a next independent slice segment are present in the same AU, a slice includes an independent slice segment as the starter of a slice sequence and the dependent slice segments prior to the next independent slice.

Slice segments may be a sequence of coding tree units (CTUs) or coding tree blocks (CTBs) consecutively ordered in a tile scan and included in a single network abstraction layer (NAL) unit. A CTU is a coding unit in a quadtree structure, which may be a largest coding unit (LCU). In this specification, the terms "CTU" and "LCU" may collectively be used as necessary for better understanding of the invention.

In a slice segment, a first CTB (CTU) of a slice segment or a portion including a data element about all CTBs (CTUs) is referred to as a slice segment head. Here, a slice segment head of an independent slice segment is referred to as a slice header.

A slice may be a transfer unit of an NAL unit. For example, an NAL unit may constructed by including slices or slice segments.

When inter prediction of the current block is performed based on the reference picture list including the inter-layer reference picture, the reference picture list may include a plurality of inter-layer reference pictures derived from a plurality of layers.

When the reference picture list includes a plurality of inter-layer reference pictures, the inter-layer reference pictures may be arranged in an interchanged manner in L0 and L1. For example, suppose that two inter-layer reference pictures, inter-layer reference picture ILRPi and inter-layer reference picture ILRPj, are included in the reference picture list used for inter prediction of the current block. In this case, ILRPi may be positioned subsequent to short-term reference pictures prior to the current picture and ILRPj may be positioned last in reference picture list L0. Also, ILRPi may be positioned last and ILRPj may be positioned subsequent to short-term reference pictures prior to the current picture in reference picture list L1.

In this case, reference picture list L0 may be constructed by sequentially including short-term reference picture(s) prior to the current picture, inter-layer reference picture ILRPi, short-term reference picture(s) subsequent to the current picture, a long-term reference picture, and inter-layer reference picture ILRPj. Reference picture list L1 may be constructed by sequentially including short-term reference picture(s) subsequent to the current picture, inter-layer reference picture ILRPj, short-term reference picture(s) prior to the current picture, a long-term reference picture, and inter-layer reference picture ILRPi.

Further, one of the two inter-layer reference pictures may be an inter-layer reference picture derived from a resolution scalable layer, and the other may be an inter-layer reference picture derived from a layer providing a different view. In this case, for instance, when ILRPi is an inter-layer reference picture derived from a layer providing a different level of resolution and ILRPj is an inter-layer reference picture derived from a layer providing a different view, in scalable video coding supporting only other scalabilities than view scalability, reference picture list L0 may be constructed by sequentially including short-term reference picture(s) prior to the current picture, inter-layer reference picture ILRPi, short-term reference picture(s) subsequent to the current picture and a long-term reference picture, and reference picture list L1 may be constructed by sequentially including short-term reference picture(s) subsequent to the current picture, short-term reference picture(s) prior to the current picture, a long-term reference picture, and inter-layer reference picture ILRPi.

Meanwhile, in inter-layer prediction, as information on the inter-layer reference picture, only a sample value may be used, only motion information (motion vector) may be used, or both a sample value and motion information may be used. When a reference picture index indicates the inter-layer reference picture, the prediction module 110 may use only the sample value of the inter-layer reference picture, only the motion information (motion vector) on the inter-layer reference picture, or both the sample value of the inter-layer reference picture and the motion information on the inter-layer reference picture depending on information received from the encoder.

When only the sample value of the inter-layer reference picture is used, the prediction module 110 may derive samples of a block specified by the motion vector in the inter-layer reference picture as a predicted sample of the current block. In scalable video coding which does not consider a view, a motion vector in inter prediction using an inter-layer reference picture (inter-layer prediction) may be set to a fixed value (for example, 0).

When only the motion information on the inter-layer reference picture is used, the prediction module 110 may use a motion vector specified in the inter-layer reference picture as a motion vector predictor for deriving a motion vector of the current block. Further, the prediction module 110 may use the motion vector specified in the inter-layer reference picture as the motion vector of the current block.

When both the sample of the inter-layer reference picture and the motion information on the inter-layer reference picture are used, the prediction module 110 may use a sample in a region corresponding to the current block in the inter-layer reference picture and motion information (motion vector) specified in the inter-layer reference picture for prediction of the current block.

When inter-layer prediction is applied, the encoder may transmit the reference index indicating the inter-layer reference picture in the reference picture list to a decoder, and also transmit information specifying which information (sample information, motion information or both sample information and motion information) on the inter-layer reference picture the encoder uses, that is, information specifying the type of dependency between two layers in inter-layer prediction, to the decoder.

The transform/quantization modules 115 and 145 may transform the residual block by TU to create transform coefficients and may quantize the transform coefficients.

A transform block is a rectangular block of samples to which the same transformation is applied. The transform block may be a TU and may have a quad-tree structure.

The transform/quantization modules 115 and 145 may perform transformation based on a prediction mode applied to the residual block and a size of the transform block and a size of the transform block to create a two-dimensional (2D) array of transform coefficients. For example, when intra prediction is applied to the residual block and the residual block has a 4×4 array, the residual block may be transformed using discrete sine transform (DST). Otherwise, the residual block may be transformed using discrete cosine transform (DCT).

The transform/quantization modules 115 and 145 may quantize the transform coefficients to create the quantized transform coefficients.

The transform/quantization modules 115 and 145 may transmit the quantized transform coefficients to the entropy coding modules 130 and 160. Here, the transform/quantization modules 115 and 145 may rearrange the 2D array of the quantized transform coefficients into a one-dimensional (1D) array in a predetermined scan order and may transmit the rearranged 1D array to the entropy coding modules 130 and 160. The transform/quantization modules 115 and 145 may transmit a reconstructed block generated on the basis of the residual block and the predicted block to the filtering modules 120 and 150 for inter prediction, without being transformation/quantization.

If necessary, the transform/quantization modules 115 and 145 may skip transformation and perform only quantization or may skip both transformation and quantization. For example, the transform/quantization modules 115 and 165 may skip transformation for a block involving a specific prediction method or having a specific size, or a block involving a specific prediction block and having a specific size.

The entropy coding modules 130 and 160 may perform entropy encoding on the quantized transform coefficients. An encoding method, such as exponential Golomb coding and context-adaptive binary arithmetic coding (CABAC), may be used for entropy encoding.

The filtering modules 120 and 150 may apply a deblocking filter, an adaptive loop filter (ALF), or a sample adaptive offset (SAO) to a reconstructed picture.

The deblocking filter may remove a block distortion generated on boundaries between blocks in the reconstructed picture. The ALF may perform a filtering process on the basis of a resulting value of comparing the original picture with the reconstructed picture of which the blocks are filtered by the deblocking filter. The SAO may reconstruct an offset difference by pixel between the residual block having been subjected to the deblocking filter and the original picture and is applied in a form of a band offset, an edge offset, or the like.

The filtering modules 120 and 150 may not apply all of the deblocking filter, the ALF and the SAO, but may apply only the deblocking filter, may apply only the deblocking filter and the ALF, or may apply only the deblocking filter and the SAO.

The DPBs 125 and 155 may receive and store the reconstructed block or the reconstructed picture from the filtering modules 125 and 150. The DPB 125 and 155 may provide the reconstructed block or picture to the prediction modules 110 and 140 that perform inter prediction.

Information output from the entropy coding module 160 for layer 0 and information output from the entropy coding module 130 for layer 1 may be multiplexed by the MUX 165 and may be output as a bitstream.

Although the encoding module 105 for layer 1 has been described to include the MUX 165 for convenience, the MUX may be a device or module independent of the encoding module 105 for layer 1 and the encoding module 135 for layer 0.

Further, although it has been described that scalable video coding is performed in a multilayer structure including two layers, the present invention is not limited thereto. For example, the encoder of FIG. 1 may also be applied to a multilayer structure including two or more layers. When the encoder is applied to a multilayer structure including N layers, layer 0 and layer 1 of FIG. 1 may be two layers having a reference relationship among the N layers.

Here, the encoder may transmit information specifying the reference relationship between the two layers to the decoder. For example, when the two layers have a dependent relationship in inter-layer prediction, the encoder may transmit direct_dependency_flag[L][M]. When direct_dependency_flag[L][M] is 1, an Lth layer may be predicted by referring to an Mth layer.

Figure 2:
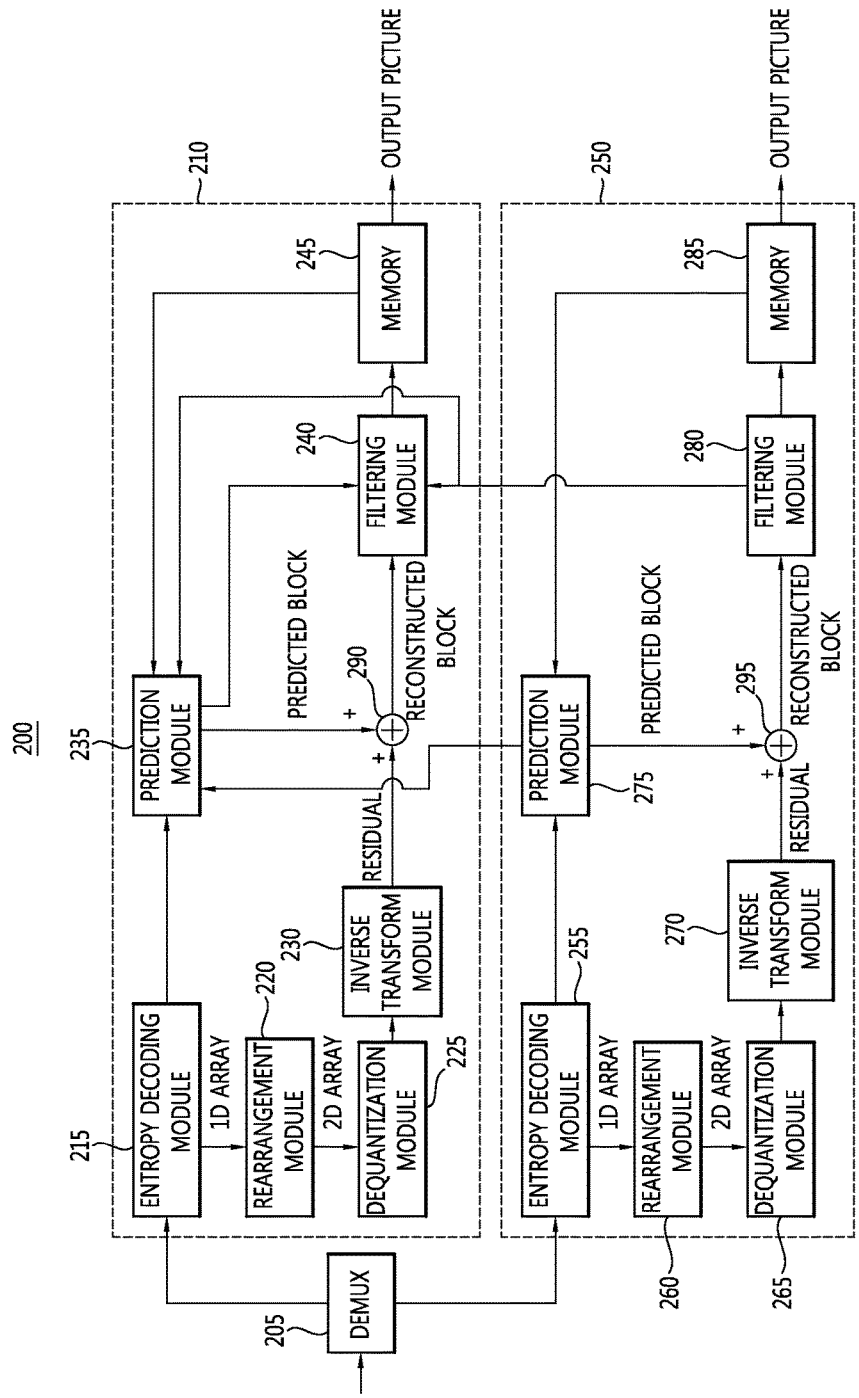
FIG. 2 is a block diagram illustrating an example of inter-layer prediction in an encoder which performs scalable coding according to the present invention.

FIG. 2 is a block diagram illustrating an example of inter-layer prediction in an encoder which performs scalable coding according to the present invention.

Referring to FIG. 2, the video decoder 200 includes a decoding module 210 for layer 1 and a decoding module 250 for layer 0.

Layer 0 may be a base layer, a reference layer or a lower layer, and layer 1 may be an enhancement layer, a current layer or an upper layer.

The decoding module 210 for layer 1 may include an entropy decoding module 215, a rearrangement module 220, a dequantization module 225, an inverse transform module 230, a prediction module 235, a filtering module 240, and a memory.

The decoding module 250 for layer 0 may include an entropy decoding module 255, a rearrangement module 260, a dequantization module 265, an inverse transform module 270, a filtering module 280, and a memory 285.

When a bitstream including video information is transmitted from the video encoder, a demultiplexer (DEMUX) 305 may demultiplex the information by layers and may transmit the information to decoders by layers.

The entropy decoding modules 215 and 255 may perform entropy decoding corresponding to an entropy coding method used in the video encoder. For example, when CABAC is used in the video encoder, the entropy decoding modules 215 and 255 may perform entropy decoding using CABAC.

Information for constructing a predicted block out of information decoded by the entropy decoding modules 215 and 255 may be provided to the prediction modules 235 and 275, and residual values entropy-decoded by the entropy decoding modules 215 and 255, that is, quantized transform coefficients, may be input to the rearrangement modules 220 and 260.

The rearrangement modules 220 and 260 may rearrange the information of the bitstream entropy-decoded by the entropy decoding modules 215 and 255, that is, the quantized transform coefficients, on the basis of a rearrangement method used in the video encoder.

For example, the rearrangement modules 220 and 260 may rearrange a 1D array of the quantized transform coefficients back into a 2D array of coefficients. The rearrangement modules 220 and 260 may perform scanning on the basis of a prediction mode applied to a current block (transform block) and/or a size of the transform block to construct a 2D array of coefficients (quantized transform coefficients).

The dequantization modules 225 and 265 may perform dequantization on the basis of a quantization parameter transmitted from the video encoder and the rearranged coefficients of the block to create transform coefficients.

The dequantization modules 225 and 265 may transmit the entropy-decoded residual values to the inverse transform modules 230 and 270, without dequantizing the residual values, depending on a predetermined condition or depending on a quantization method used for the video encoder.

In the video encoder, DCT and/or DST may be selectively performed depending on a plurality of information pieces, such as a prediction method, a size of a current block and a prediction direction, and the inverse transform modules 230 and 270 of the video decoder may perform inverse transformation on the basis of transform information used by the video decoder.

For example, the inverse transform modules 230 and 270 may perform inverse DCT and inverse DST depending on a prediction mode/block size. Specifically, the inverse transform modules 230 and 270 may perform inverse DST on a 4×4 luma block to which intra prediction has been applied.

Alternatively, the inverse transform modules 230 and 270 may fixedly use a specific inverse transformation method regardless of a prediction mode/block size. For example, the inverse transform modules 230 and 270 may apply only inverse DST to all transform blocks. The inverse transform modules 230 and 270 may also apply only inverse DCT to all transform blocks.

The inverse transform modules 230 and 270 may inversely transform the transform coefficients or a block of the transform coefficients to construct a residual signal or a residual block.

The inverse transform modules 230 and 270 may skip transformation if necessary or depending on an encoding method used for the video encoder. For example, the inverse transform modules 230 and 270 may skip transformation for a block involving a specific prediction method or having a specific size, or a block involving a specific prediction block and having a specific size.

The prediction modules 235 and 275 may construct a predicted block of the current block on the basis of predicted block construction information provided from the entropy decoding modules 215 and 255 and information on a previously decoded block and/or picture provided from the memories 245 and 285.

When a prediction mode for the current block is an intra prediction mode, the prediction modules 235 and 275 may perform intra prediction on the current block on the basis of information on a pixel in a current picture.

When the prediction mode for the current block is an inter prediction mode, the prediction modules 235 and 275 may perform inter prediction on the current block on the basis of information included in at least one of a previous picture and a subsequent picture of the current picture. Part or all of motion information necessary for inter prediction may be derived based on information received from the video encoder.

When the skip mode is used as an inter prediction mode, the residual may not be transmitted from the video encoder and the predicted block may be used as a reconstructed block.

The prediction module 235 for layer 1 may perform inter prediction or intra prediction using only information in layer 1 and may perform inter-layer prediction using information on another layer (layer 0).

Information on a current layer predicted using information on another layer (that is, predicted by inter-layer prediction) may be at least one of a texture, motion information, unit information, and a predetermined parameter (for example, a filtering parameter).

The information on another layer information used for prediction of the current layer (that is, used for inter-layer prediction) may be at least one of a texture, motion information, unit information, and a predetermined parameter (for example, a filtering parameter).

In inter-layer prediction, a current block is a block in a current picture in a current layer (layer 1 in FIG. 2), which may be a block to be decoded. A reference block is a block in a picture (reference picture) belonging to the same access unit (AU) as the picture (current picture) including the current block, which may be a block corresponding to the current block in a layer (reference layer, layer 0 in FIG. 2) which is referred to in prediction of the current block.

An example of inter-layer prediction includes inter-layer motion prediction which predicts motion information on a current layer using motion information on a reference layer. According to inter-layer motion prediction, motion information on a current block may be predicted using motion information on a reference block.

When inter-layer motion prediction is applied, the prediction module 235 may scale and use motion information on a reference layer.

As another example of inter-layer prediction, inter-layer texture prediction may use a texture of a reconstructed reference block as the predictive value of a current block. Here, the prediction module 235 may scale the texture of the reference block by upsampling.

As still another example of inter-layer prediction, inter-layer unit information prediction may derive unit (CU, PU and/or TU) information on a reference layer to use as unit information on a current layer, or determine unit information on the current layer based on unit information on the reference layer.

Unit information may include information in each unit level. For instance, CU information may include information on partition (CU, PU and/or TU), information on transformation, information on prediction, and information on coding. PU information may include information on PU partition and information on prediction (for example, motion information and information on a prediction mode). TU information may include information on TU partition and information on transformation (transform coefficients and transform methods).

As yet another example of inter-layer prediction, inter-layer parameter prediction may reuse a derived parameter of a reference layer for a current layer or predict a parameter for the current layer based on the parameter used for the reference layer.

As still another example of inter-layer prediction, inter-layer residual prediction may predict a residual of a current layer using residual information on another layer and predict a current block based on the residual of the current layer.

As yet another example of inter-layer prediction, inter-layer differential prediction may predict a current block using a differential between pictures obtained by upsampling or downsampling a reconstructed picture in a current layer and a reconstructed picture in a reference layer.

As still another example of inter-layer prediction, inter-layer syntax prediction may predict or generate a texture of a current block using syntax information on a reference layer. Here, the syntax information on the reference layer used for reference may include information on an intra prediction mode and motion information.

A plurality of inter-layer prediction methods among the afore-described methods may be used in prediction of a particular block.

Although inter-layer texture prediction, inter-layer motion prediction, inter-layer unit information prediction, inter-layer parameter prediction, inter-layer residual prediction, inter-layer differential prediction, and inter-layer syntax prediction have been described as examples of inter-layer prediction, inter-layer prediction applicable to the present invention is not limited thereto.

For instance, inter-layer prediction may be applied as an extension of inter prediction for a current layer. That is, a reference picture derived from a reference layer may be included in reference pictures available for reference in inter prediction of a current block to conduct inter prediction of the current block.

The prediction module 235 may perform inter-layer prediction using an inter-layer reference picture when a reference picture index received from an encoder or derived from a neighboring block indicates the inter-layer reference picture in a reference picture list. For example, when the reference picture index indicates the inter-layer reference picture, the prediction module 235 may derive the sample value of a region specified by a motion vector in a reference picture as a predicted block of the current block.

In this case, an inter-layer reference picture may be included in a reference picture list for the current block. The prediction module 235 may perform inter prediction of the current block using the inter-layer reference picture.

Here, the inter-layer reference picture may be a reference picture constructed by sampling a reconstructed picture in the reference layer to correspond to the current layer. Thus, when the reconstructed picture in the reference layer corresponds to a picture in the current layer, the reconstructed picture in the reference layer may be used as an inter-layer reference picture without sampling. For instance, when samples of the reconstructed picture in the reference layer and the reconstructed picture in the current layer have the same width and height and offsets between the picture in the reference layer and the picture in the current layer at the top left, top right, bottom left and bottom right are 0, the reconstructed picture in the reference layer may be used as an inter-layer reference picture for the current layer without being subjected to sampling.

The reconstructed picture in the reference layer from which the inter-layer reference picture is derived may belong to the same AU as the current picture to be encoded. When inter prediction of the current block is performed with the reference picture list including the inter-layer reference picture, the position of the inter-layer reference picture in the reference picture list may vary in reference picture lists L0 and L1. For instance, in reference picture list L0, the inter-layer reference picture may be positioned subsequent to short-term reference pictures prior to the current picture. In reference picture list L1, the inter-layer reference picture may be positioned last.

Here, reference picture list L0 is a reference picture list used for inter prediction of a P slice or used as a first reference picture list in inter prediction of a B slice. Reference picture list L1 is a second reference picture list used in inter prediction of the B slice.

Thus, reference picture list L0 may be constructed by sequentially including short-term reference picture(s) prior to the current picture, the inter-layer reference picture, short-term reference picture(s) subsequent to the current picture, and a long-term reference picture. Reference picture list L1 may be constructed by sequentially including short-term reference picture(s) subsequent to the current picture, short-term reference picture(s) prior to the current picture, a long-term reference picture, and the inter-layer reference picture.

Here, a P slice is a slice to be subjected to intra prediction or to inter prediction using at most one motion vector per prediction block and a reference picture index. A B slice is a slice to be subjected to intra prediction or to prediction using at most two motion vectors per prediction block and a reference picture index. Further, an I slice is a slice subjected only to intra prediction.

When inter prediction of the current block is performed based on the reference picture list including the inter-layer reference picture, the reference picture list may include a plurality of inter-layer reference pictures derived from a plurality of layers.

When the reference picture list includes a plurality of inter-layer reference pictures, the inter-layer reference pictures may be arranged in an interchanged manner in L0 and L1. For example, suppose that two inter-layer reference pictures, inter-layer reference picture ILRPi and inter-layer reference picture ILRPj, are included in the reference picture list used for inter prediction of the current block. In this case, ILRPi may be positioned subsequent to short-term reference pictures prior to the current picture and ILRPj may be positioned last in reference picture list L0. Also, ILRPi may be positioned last and ILRPj may be positioned subsequent to short-term reference pictures prior to the current picture in reference picture list L1.

In this case, reference picture list L0 may be constructed by sequentially including short-term reference picture(s) prior to the current picture, inter-layer reference picture ILRPi, short-term reference picture(s) subsequent to the current picture, a long-term reference picture, and inter-layer reference picture ILRPj. Reference picture list L1 may be constructed by sequentially including short-term reference picture(s) subsequent to the current picture, inter-layer reference picture ILRPj, short-term reference picture(s) prior to the current picture, a long-term reference picture, and inter-layer reference picture ILRPi.

Further, one of the two inter-layer reference pictures may be an inter-layer reference picture derived from a resolution scalable layer, and the other may be an inter-layer reference picture derived from a layer providing a different view. In this case, for instance, when ILRPi is an inter-layer reference picture derived from a layer providing a different level of resolution and ILRPj is an inter-layer reference picture derived from a layer providing a different view, in scalable video coding supporting only other scalabilities than view scalability, reference picture list L0 may be constructed by sequentially including short-term reference picture(s) prior to the current picture, inter-layer reference picture ILRPi, short-term reference picture(s) subsequent to the current picture and a long-term reference picture, and reference picture list L1 may be constructed by sequentially including short-term reference picture(s) subsequent to the current picture, short-term reference picture(s) prior to the current picture, a long-term reference picture, and inter-layer reference picture ILRPi.

Meanwhile, in inter-layer prediction, as information on the inter-layer reference picture, only a sample value may be used, only motion information (motion vector) may be used, or both a sample value and motion information may be used. When a reference picture index indicates the inter-layer reference picture, the prediction module 235 may use only the sample value of the inter-layer reference picture, only the motion information (motion vector) on the inter-layer reference picture, or both the sample value of the inter-layer reference picture and the motion information on the inter-layer reference picture depending on information received from the encoder.

When only the sample value of the inter-layer reference picture is used, the prediction module 235 may derive samples of a block specified by the motion vector in the inter-layer reference picture as a predicted sample of the current block. In scalable video coding which does not consider a view, a motion vector in inter prediction using an inter-layer reference picture (inter-layer prediction) may be set to a fixed value (for example, 0).

When only the motion information on the inter-layer reference picture is used, the prediction module 235 may use a motion vector specified in the inter-layer reference picture as a motion vector predictor for deriving a motion vector of the current block. Further, the prediction module 235 may use the motion vector specified in the inter-layer reference picture as the motion vector of the current block.

When both the sample of the inter-layer reference picture and the motion information on the inter-layer reference picture are used, the prediction module 235 may use a sample in a region corresponding to the current block in the inter-layer reference picture and motion information (motion vector) specified in the inter-layer reference picture for prediction of the current block.

The decoder may receive the reference index indicating the inter-layer reference picture in the reference picture list from the encoder and perform inter-layer prediction based on the reference index. Also, the decoder may receive information specifying which information (sample information, motion information or both sample information and motion information) on the inter-layer reference picture the decoder uses, that is, information specifying the type of dependency between two layers in inter-layer prediction, from the encoder.

Adders 290 and 295 may construct a reconstructed block using the predicted block constructed by the prediction modules 235 and 275 and the residual block constructed by the inverse transform modules 230 and 270. In this case, the adders 290 and 295 may be considered as separate modules (reconstructed block constructing module) that construct a reconstructed block.

The block and/or picture reconstructed by the adders 290 and 295 may be supplied to the filtering modules 240 and 280.

Referring to FIG. 2, the filtering module 240 for layer 1 may perform a filtering operation on the reconstructed picture using the parameter information transmitted from the prediction module 235 for layer 1 and/or the filtering module 280 for layer 1. For example, the filtering module 240 for layer 1 may perform a filtering operation on layer 1 or an inter-layer filtering operation using a parameter predicted from a filtering parameter applied to layer 0.

The memories 245 and 285 may store the reconstructed block or picture for use as a reference picture or reference block. The memories 245 and 285 may output the reconstructed picture stored in the memories 245 and 285 via a predetermined output module (not shown) or a display (not shown).

Although FIG. 2 illustrates the rearrangement modules, the dequantization modules and the inverse transform modules as independent modules, the video decoder may also be configured to enable the dequantization/inverse transform modules as a single module to sequentially perform rearrangement, dequantization, and inverse transform like the video encoder of FIG. 1.

Further, although it has been described that scalable video decoding is performed in a multilayer structure including two layers, the present invention is not limited thereto. For example, the decoder of FIG. 2 may also be applied to a multilayer structure including two or more layers. When the encoder is applied to a multilayer structure including N layers, layer 0 and layer 1 of FIG. 2 may be two layers having a reference relationship among the N layers.

Here, the decoder may receive information specifying the reference relationship between the two layers from the encoder. For example, when the two layers have a dependent relationship in inter-layer prediction, the decoder may receive direct_dependency_flag[L][M]. When direct_dependency_flag[L][M] is 1, an Lth layer may be predicted by referring to an Mth layer.

Although FIGS. 1 and 2 illustrate the prediction modules, the prediction module for layer 1 may include an inter-layer prediction module that performs a prediction process using information on another layer (layer 0) and an inter/intra prediction module that performs a prediction process without using information on another layer (layer 0).

In encoding and decoding of a video supporting a plurality of layers in a bitstream, that is, scalable coding, there are strong correlations among the plurality of layers. Thus, when prediction is performed using the correlations, redundant elements of data may be removed and video encoding performance may be enhanced.

A plurality of layers may be different from one another in at least one of resolution, frame rate, color format and view. Thus, upsampling or downsampling for adjusting resolution may be performed to use information on another layer in inter-layer prediction.

Inter-layer dependency between different layers indicates whether a block/picture in one layer is decoded by referring to a block/picture in another layer. Thus, in a multilayer structure, when there is dependency between a current layer and a reference layer, the current layer may be predicted by referring to the reference layer. A "layer" may be a representation of a coding dimension. A coding dimension may include scalability (for example, spatial scalability, temporal scalability and quality scalability), a view and a depth coding representation. It is regarded that inter-layer dependency is considered when inter-layer prediction is applied, without being limited thereto. For example, inter-layer dependency may also be considered in inter-layer intra prediction, inter-layer motion prediction, inter-layer syntax prediction, inter-layer residual prediction and inter-layer unit prediction which are described above.

When a picture in a particular layer is processed, the encoder may select whether to use inter-layer prediction based on rate and distortion (R-D) performance.

Figure 3:
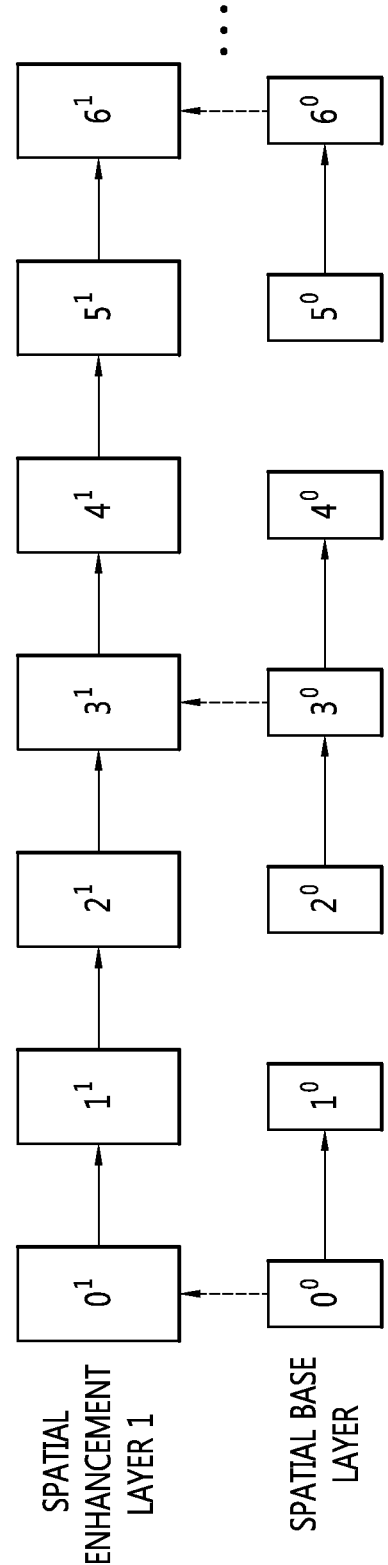
FIG. 3 schematically illustrates an example of a sequence structure of two spatial layers according to the present embodiment.

FIG. 3 schematically illustrates an example of a sequence structure of two spatial layers according to the present embodiment.

A spatial layer refers to a layer in which spatial scalability is supported.

Referring to FIG. 3, black bold arrows indicate temporal dependency between pictures in the same spatial layer. In FIG. 3, red dotted arrows indicate inter-layer dependency between pictures in different spatial layers.

In the example of FIG. 3, $x^y$ represents an xth picture in layer y.

FIG. 3 shows that inter-layer prediction is applied to picture 0, picture 3, picture 6, and the like. In the structure illustrated in FIG. 3, the encoding order of pictures and delivery order of the pictures from an encoder to a decoder are the same as order 1 as follows.

Order 1: $0^0\ 0^1\ 1^0\ 1^1\ 2^0\ 2^1\ 3^0\ 3^1\ 4^0\ 4^1\ 5^0\ 5^1\ 6^0\ 6^1\ \ldots$ The decoding order of the pictures and receiving order of the pictures from the encoder to the decoder are also the same as order 1.

Here, inter-layer prediction may optionally be used.

That is, inter-layer prediction may not be applied to all pictures in a layer other than a top layer.

For example, in FIG. 3, when a target layer for display is spatial enhancement layer 1, all pictures in a spatial base layer may not need decoding. In FIG. 3, for instance, pictures $1^0$ and $4^0$ may not need decoding, because, as shown, two pictures $1^0$ and $4^0$ are not used as reference pictures in inter-layer prediction and not referred to directly/indirectly by pictures used for inter-layer prediction among pictures in the same spatial layer (base layer).

Thus, when $1^0$ and $4^0$ are not decoded, the delivery order of the pictures from the encoder to the decoder is order 1 but the decoding order of the pictures is order 2.

Order 2: $0^0\ 1^1\ 2^0\ 2^1\ 3^0\ 3^1\ 4^1\ 5^0\ 5^1\ 6^0\ 6^1\ \ldots$

Comparing order 1 and order 2, pictures $1^0$ and $4^0$ are excluded from decoding in order 2. As described above, two pictures $1^0$ and $4^0$ are not used as reference pictures in inter-layer prediction and not referred to directly/indirectly by pictures used for inter-layer prediction among pictures in the same spatial layer (base layer).

As in order 2, when a picture neither used in inter-layer prediction nor referred to directly/indirectly by other pictures in the same layer used for inter-layer prediction is not decoded, the following advantages are obtained.

(1) Computing resource saving: computing resources are be used for computing/decoding of other pictures instead of computing/decoding of such pictures, thereby increasing the speeds of encoding/decoding processes.

(2) Memory saving: such pictures are not computed, and thus it is not necessary to allocate a memory space for the pictures, thereby saving a memory space.

However, although the advantages are obtained as a picture neither used in inter-layer prediction nor referred to directly/indirectly by other pictures in the same layer used for inter-layer prediction is not decoded, there is needed a method of identifying which picture is skipped for decoding or which picture is removed from an input sequence when a target layer for decoding/display is given.

Hereinafter, a method of determining which picture is skipped/dropped for decoding according to the present invention will be described.

Various methods, such as transmitting explicit information, changing a decoding method and memory management, may be used as a method for not decoding a picture neither used in inter-layer prediction nor referred to directly/indirectly by other pictures in the same layer used for inter-layer prediction.

Embodiment I. Skipping of Decoding of Base Layer Picture Based on Transmission of Explicit Information According to the present method, explicit information on each picture is transmitted, thereby indicating whether the picture is necessary for inter-layer prediction (referred to in inter-layer prediction of another layer).

Transmitted first information may indicate whether a picture in a layer indicated by the first information is necessary for inter-layer prediction of a picture in another layer (referred to in inter-layer prediction of the picture in the other layer).

When the first information is defined as ilp_flag, ilp_flag equal to 1 may indicate that a corresponding layer is necessary for inter-layer prediction of another layer, and ilp_flag equal to 0 may indicate that the layer is not necessary for inter-layer prediction of the other layer.

The first information may be transmitted in an NAL unit header or slice header. In addition, the first information may be transmitted within a constraint. For example, when the first information is transmitted in the slice header, according to a constraint, the value of the first information may be the same in each slice header in the same picture.

Transmitted second information may be information indicating whether a picture specified by the second information is referred to directly/indirectly by pictures needed for inter-layer prediction among other pictures in the same layer.

For example, when the second information is defined as ilp_ref_flag, ilp_ref_flag equal to 1 may indicate that a picture specified by ilp_ref_flag is a picture directly/indirectly referred to by pictures needed for inter-layer prediction among other pictures in the same layer.

The second information may be transmitted in an NAU unit header or slice header. In addition, the second information may be transmitted within a certain constraint. For example, when the second information is transmitted in the slice header, according to a constraint, the value of the second information may be the same in each slice header in the same picture.

In the first information and the second information, a "picture specified by information" refers to a picture to which the information is applied.

The first information (for example, ilp_flag) and the second information (for example, ilp_ref_flag) may be independent of each other, and each picture may have different values of ilp_ref and ilp_ref_flag. For example, ilp_flag may have an independent value from that of ilp_ref_flag. Likewise, ilp_ref_flag may have an independent value from that of ilp_flag.

Hereinafter, for convenience of description, exemplary embodiments of the present invention will be described with reference to ilp_flag as an example of first information and ilp_ref_flag as an example of second information.

Embodiment I-1. Transmission of Information in NAL Unit Header

In transmission of embodiment I-1, the first information and the second information may be transmitted in an NAL unit header. For instance, ilp_flag and ilp_ref_flag may be transmitted in the NAL unit header as in Table 1.

TABLE 1

| nal_unit_header( ) { | Descriptor |
|---|---|
| ... | |
| ilp_flag | u(1) |
| ilp_ref_flag | u(1) |
| ... | |
| } | |

As described above, ilp_flag indicates whether a current coded picture is available for inter-layer prediction. ilp_ref_flag indicates that the current coded picture is referred to or used by picture(s) needed for inter-layer prediction among pictures in the same layer.

That is, in the present embodiment, ilp_flag and ilp_ref_flag are transmitted in the NAL unit header and indicate whether a picture corresponding to the NAL unit header is directly/indirectly used for inter-layer prediction.

The decoder may receive ilp_flag and ilp_ref_flag in the NAL unit header, and omit decoding of a target picture in a reference layer when ilp_flag and ilp_ref_flag indicate that the target picture is not directly/indirectly used for inter-layer prediction of a current block (a block to be decoded in the current layer).

Embodiment I-2. Transmission of Information in Slice Segment Header

In transmission of embodiment I-2, the first information and the second information may be transmitted in a slice segment header. For instance, ilp_flag and ilp_ref_flag may be transmitted in the slice segment header as in Table 2.

TABLE 2

| slice_segment_header( ) { | Descriptor |
|---|---|
| ... | |
| ilp_flag | u(1) |
| ilp_ref_flag | u(1) |
| ... | |
| } | |

As described above, ilp_flag indicates whether a current slice is available for inter-layer prediction. ilp_ref_flag indicates that the current slice is referred to or used by picture(s) needed for inter-layer prediction among pictures in the same layer.

That is, in the present embodiment, ilp_flag and ilp_ref_flag are transmitted in the slice segment header and indicate whether a slice corresponding to the slice segment header is directly/indirectly used for inter-layer prediction.

The decoder may receive ilp_flag and ilp_ref_flag in the slice segment header, and omit decoding of a target slice or picture in a reference layer when ilp_flag and ilp_ref_flag indicate that the target slice is not directly/indirectly used for inter-layer prediction of a current block (a block to be decoded in the current layer).

Alternatively, ilp_flag indicates whether a current coded picture is available for inter-layer prediction, in which the value of ilp_flag may be the same in all slice segment headers of the coded picture. Also, ilp_ref_flag indicates whether the current coded pictures is referred to or used by picture(s) needed for inter-layer prediction among pictures in the same layer, in which the value of ilp_ref_flag may be the same in all slice segment headers of the coded picture.

In this case, the decoder may receive ilp_flag and ilp_ref_flag in the slice segment header, and omit decoding of a picture including a target slice in a reference layer when ilp_flag and ilp_ref_flag indicate that the target slice is not directly/indirectly used for inter-layer prediction of a current block (a block to be decoded in the current layer).

Embodiment I-3. Transmission of Information on Sub-layers in Video Parameter Set (VPS)

In the present embodiment, the first information (ilp_flag) may be transmitted by two methods.

In method 1, the value of ilp_flag of each sub-layer may be the same for the same sub-layer in a different layer as in Table 3.

TABLE 3

| video_parameter_set_rbsp( ) { | Descriptor |
|---|---|
| ... | |
| vps_max_sub_layers_minus1 | u(3) |
| ... | |
| for( i = 0; i<= vps_max_sub_layers_minus1; i++ ) { | |
| ... | |
| vps_ilp_flag[ i ] | u(1) |
| } | |
| ... | |
| } | |

In the VPS of Table 3, vps_max_sub_layers_minus1 specifies the maximum number of temporal sub-layers which may be present in a coded video sequence. In the VPS of Table 3, vps_ilp_flag[i] equal to 1 indicates that a picture/slice with a temporal ID (hereinafter, "temporalID") equal to i among coded pictures/slices is available for inter-layer prediction, in which temporalID specifies a sub-layer. Otherwise, that is, vps_ilp_flag[i] equal to 0 indicates that the picture/slice with temporalID equal to i among the coded pictures/slices is unavailable for inter-layer prediction.

In method 2, the value of ilp_flag of each sub-layer may be different from the value of ilp_flag of the same sub-layer in a different layer as in Table 4.

TABLE 4

| video_parameter_set_rbsp( ) { | Descriptor |
|---|---|
| ... | |
| vps_max_num_layers_minus1 | u(6) |
| vps_max_sub_layers_minus1 | u(3) |
| ... | |
| for( i = 0; i < vps_max_num_layers_minus1; i++ ) | |
|   for( j = 0; j <= vps_max_sub_layers_minus1; j++ ) | |
|     vps_ilp_flag[ i ][ j ] | u(1) |
| } | |
| ... | |
| } | |

In the VPS of Table 4, vps_max_num_layers_minus1 specifies the number of layers that may be present in a coded video sequence, and vps_max_sub_layers_minus1 specifies the maximum number of temporal sub-layers that may be present in the coded video sequence. In Table 4, vps_ilp_flag[i][j] equal to 1indicates that a picture/slice with a layer ID (hereinafter, "LayerID") equal to i and temporalID equal to j among coded pictures/slices is available for inter-layer prediction, in which LayerID specifies a layer. Otherwise, that is, vps_ilp_flag[i] equal to 0 indicates that the picture/slice with LayerID equal to i and temporalID equal to j among the coded pictures/slices is unavailable for inter-layer prediction.

Adoption of method 1 may decrease complexity and reduce traffic, and adoption of method 2 may obtain high flexibility for improvement in effects of inter-layer prediction.

Embodiment I-4. Combination of Transmissions of Inter-layer Prediction Information on Picture and Sub-layers According to the present embodiment, inter-layer information may be transmitted in combination. Specifically, ilp_flag and ilp_ref_flag in a slice segment header may be applied together with ilp_flag of a sub-layer.

In this case, the following constraints may be applied. (1) When ilp_flag is equal to 1 with respect to temporalID ilp_flag may be 1 or 0 in a slice segment header with temporalID equal to i. (2) When ilp_flag is equal to 0 with respect to temporalID i, ilp_flag is 0 in a slice segment header with temporalID equal to i.

Embodiment II. Skipping of Decoding of Base Layer Picture Based on Decoding Method According to the present embodiment, a delivery/transport system between the encoder and the decoder and the decoder may be improved in efficiency. The present embodiment allows the delivery system and the decoder to effectively determine whether a coded picture with a particular layer ID, ilp_flag, and ilp_ref_flag needs processing.

In detail, embodiment II allows the delivery/transport system between the encoder and the decoder to determine whether a package including a coded picture with a particular layer ID, ilp_flag, and ilp_ref_flag needs transmitting or dropping. Embodiment II also allows the decoder to determine whether a coded picture with a particular layer ID, ilp_flag, and ilp_ref_flag needs coding.

In the present specification including embodiment II, TargetLayer, which specifies a target layer, is the layer ID of the highest layer displayed or output by the decoder. Also, LayerID is the layer ID of each coded picture, ilp_flag represents the ilp_flag value of each coded picture, and ilp_ref_flag represents the ilp_ref_flag value of each coded picture.

According to the present embodiment, when the following conditions are satisfied with respect to particular TargetLayer, a coded picture corresponding to TargetLayer is not coded or is dropped.

Condition (i) LayerID<TargetLayer

Condition (ii) ilp_flag value is false, that is, ilp_flag is equal to 0.

Condition (iii) ilp_ref_flag value is false, that is, ilp_ref_flag is equal to 0.

Figure 4:
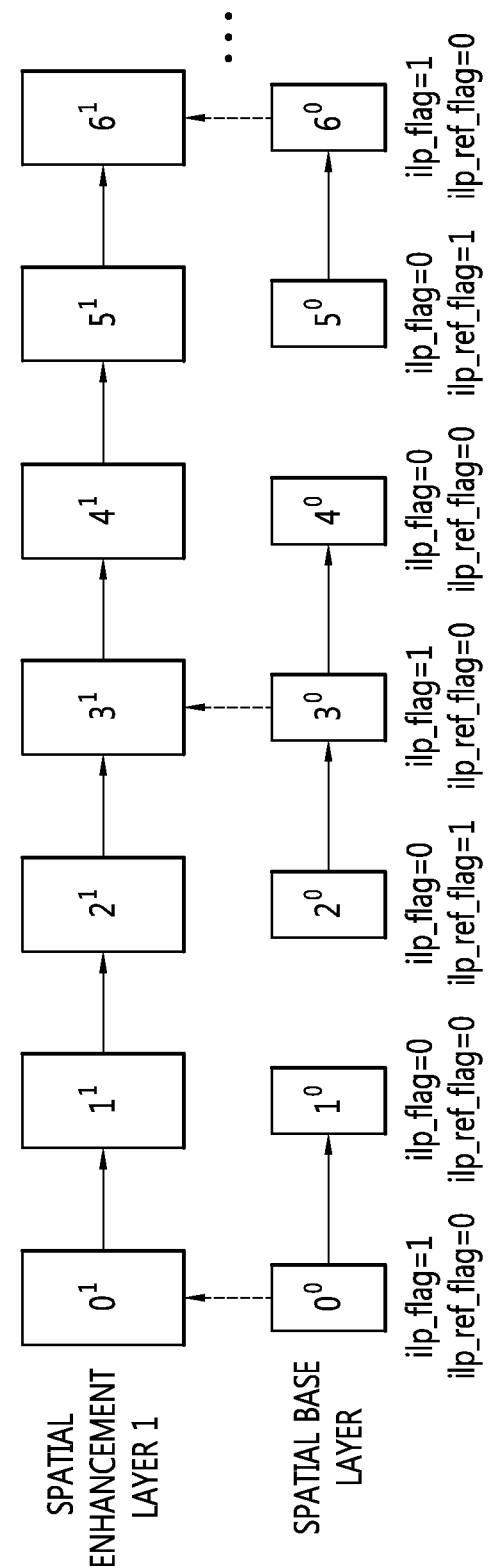
FIG. 4 is a diagram schematically illustrating the present embodiment, which shows an example of a method of removing coded pictures that do not need transmitting to a decoder or decoding.

FIG. 4 is a diagram schematically illustrating the present embodiment, which shows an example of a method of removing coded pictures that do not need transmitting to the decoder or decoding.

Referring to FIG. 4, when a target layer is spatial enhancement layer 1, coded pictures $1^0$ and $4^0$ do not need transmitting to the decoder or decoding, because pictures $1^0$ and $4^0$ satisfy the foregoing conditions (i) to (iii).

That is, in FIG. 4, pictures $1^0$ and $4^0$ are pictures in layer 0, which have LayerID smaller than that of TargetLayer and have ilp_flag and ilp_ref_flag equal to 0.

Thus, in FIG. 4, encoding order/delivery order is order 3, and decoding order is order 4.

Order 3: $0^0$ $0^1$ $1^0$ $1^1$ $2^0$ $2^1$ $3^0$ $3^1$ $4^0$ $4^1$ $5^0$ $5^1$ $6^0$ $6^1$ Order 4: $0^0$ $0^1$ $1^1$ $2^0$ $2^1$ $3^0$ $3^1$ $4^1$ $5^0$ $5^1$ $6^0$ $6^1$ Thus, according to embodiment II, the encoder may not transmit the pictures when all of conditions (i) to (iii) are satisfied, and the decoder may drop or not decode the pictures when all of conditions (i) to (iii) are satisfied.

Embodiment III. Skipping of Decoding of Base Layer Picture Based on Memory Management According to the present embodiment, it may be determined based on memory management of the encoder and the decoder whether to store or retain a reconstructed picture of a coded picture corresponding to a particular layer ID, ilp_flag, and ilp_ref_flag in a memory.

Also, according to the present embodiment, it may be determined based on memory management of the encoder and the decoder whether to remove a reconstructed picture of a coded picture corresponding to a particular layer ID, ilp_flag, and ilp_ref_flag from a memory.

In embodiment III and the present specification, the memory may be a decoded picture buffer (DPB).

In the present embodiment, TargetLayer, which specifies a target layer, is also the layer ID of the highest layer displayed or decoded by the decoder. Also, LayerID is the layer ID of each coded picture, ilp_flag represents the ilp_flag value of each coded picture, and ilp_ref_flag represents the ilp_ref_flag of each coded picture.

In the present embodiment, a reconstructed picture of a coded picture may not be retained in the memory when the following conditions (i) to (iii) are satisfied with respect to given particular TargetLayer.

Condition (i) LayerID<TargetLayer

Condition (ii) ilp_flag value is false, that is, ilp_flag is equal to 0.

Condition (iii) ilp_ref_flag value is false, that is, ilp_ref_flag is equal to 0.

Also, in the present embodiment, with respect to given particular TargetLayer, after a coded picture with picture order count (POC), which corresponds to the output order of a picture, equal to pic_curr and with LayerID equal to curr_layer_id (that is, layer_id≤TargetLayer) is decoded, a reference picture satisfying the following conditions (a) to (d) is removed among reference pictures in the memory.

Condition (a) POC of a reference picture is equal to poc_curr.

Condition (b) LayerID of a reference picture is smaller than curr_layer_id.

Condition (c) ilp_flag of a reference picture is true, that is, ilp_flag of a reference picture, is equal to 1.

Condition (d) ilp_ref_flag of a reference picture is false, that is, ilp_ref_flag of a reference picture is equal to 0.

Here, condition (c) may be applied always or optionally.

According to the present embodiment, the decoder does not store or retain the reconstructed picture in the memory when LayerID<TargetLayer and ilp_flag and ilp_ref_flag are equal to 0.

In addition, after a picture with POC equal to pic_curr and LayerID equal to curr_layer_id is decoded, the decoder may remove a picture with POC equal to poc_curr, LayerID smaller than curr_layer_id, ilp_flag equal to 1, and ilp_ref_flag equal to 0 among reference pictures from the memory.

When memory management considering TargetLayer and utilizing ilp_flag and ilp_ref_flag according to embodiment III is employed, the size of the memory needed for processing and decoding a bitstream may be reduce.

Figure 5:
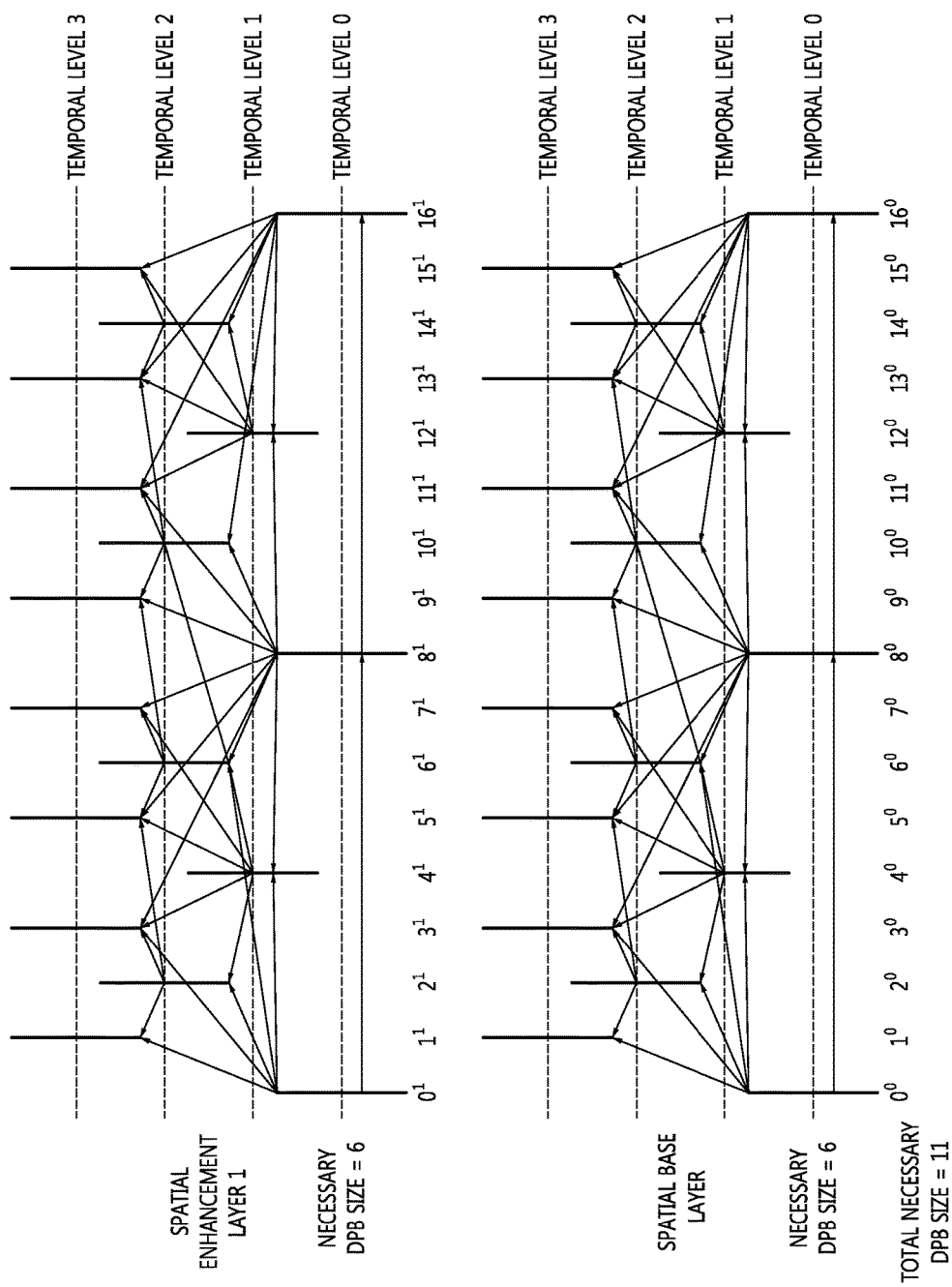
FIG. 5 schematically illustrates an example of memory management.

FIG. 5 schematically illustrates an example of memory management.

Referring to FIG. 5, it may be verified that application of memory management according to the present embodiment leads to a decrease in the size of the memory.

In the example of FIG. 5, a picture structure based on a random access setting is illustrated. FIG. 5 shows two spatial scalability layers including four temporal levels.

In FIG. 5, pictures with temporal levels of 0 and 1 in a spatial base layer may be used in inter-layer prediction. On the contrary, pictures with temporal levels of 2 and 3 in the spatial base layer are not used for inter-layer prediction.

In this structure of FIG. 5, it is needed to allocate a memory for storing at least six reference pictures in decoding the spatial base layer. Here, when ilp_flag and ilp_ref_flag are not utilized, it is needed to allocate a memory for storing at least 11 reference pictures in decoding a spatial enhancement layer.

Figure 6:
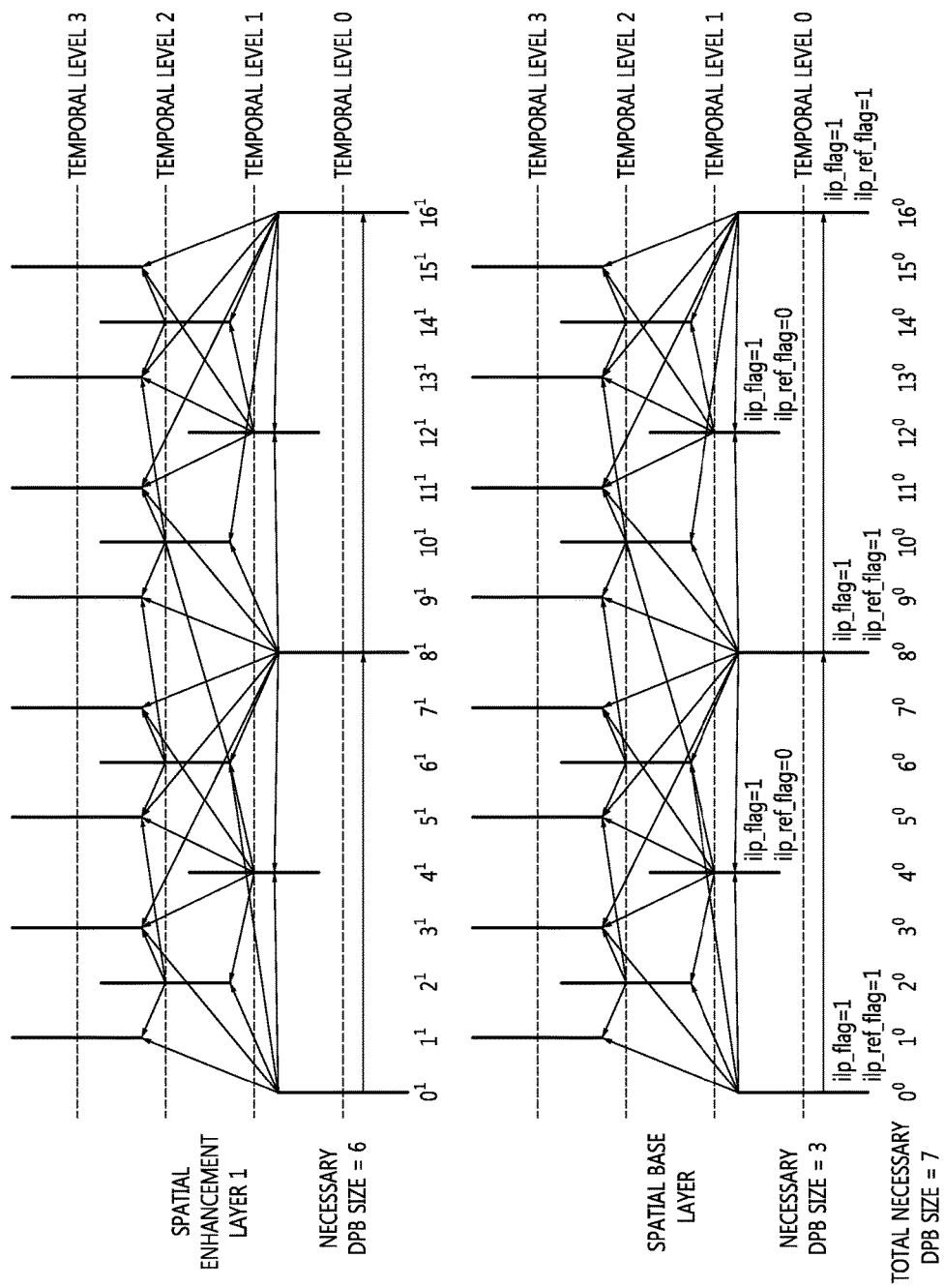
FIG. 6 schematically illustrates an example of memory management according to the present invention.

FIG. 6 schematically illustrates an example of memory management according to the present invention.

The example of FIG. 6 has the same picture structure as the example of FIG. 5. However, unlike in FIG. 5, the example of FIG. 6 utilizes two pieces of information, ilp_flag and ilp_ref_flag.

When these two pieces of information, ilp_flag and ilp_ref_flag, are utilized, it may be indicated that the pictures with temporal levels of 2 and 3 in the spatial base layer are not needed for decoding the enhancement layer based on inter-layer prediction and thus may be removed.

Unlike in FIG. 5 where ilp_flag and ilp_ref_flag are not utilized, the example of FIG. 6 utilizing ilp_flag and ilp_ref_flag, as shown, needs to allocate a memory for storing three pictures only in decoding the spatial base layer.

FIG. 7 schematically illustrates a case in which pictures not needed for decoding are excluded in the example of FIG. 6.

As illustrated in FIG. 6, in the picture structure shown in FIGS. 5 to 7, the pictures with temporal levels of 2 and 3 among the pictures in the base layer are not used in decoding the enhancement layer and thus may be removed from the memory as in FIG. 7. Thus, in FIGS. 6 and 7, a memory for storing three pictures is sufficient for the base layer unlike in FIG. 5.

FIG. 8 schematically illustrates an example of content/memory state/DPB state in decoding each picture. In FIG. 8, each picture is described according to decoding order and a picture structure is the same as that in FIGS. 6 and 7.

It is assumed that TargetLayer is also 1 in FIG. 8.

Pictures marked with X are removed from the DPB.

As illustrated in FIG. 8, when memory management according to the present embodiment is applied, a necessary memory size is reduced from a memory size for storing 11 pictures to a memory size for storing 7 pictures.

Embodiment IV. Skipping of Decoding of Base Layer Picture Based on Construction and Management of Reference Picture List In the present embodiment, a method of constructing a reference picture list may be modified using ilp_flag and ilp_ref_flag.

When ilp_flag and ilp_ref_flag are used according to the present embodiment, a reference picture list for a slice may be constructed as follows.

① When the ilp_flag value of the slice is 0, the reference picture list for the slice may be constructed based on a reference picture set (RPS) only. That is, a current reference picture list is not changed.

② When the ilp_flag value of the slice is 1, the reference picture list for the slice is constructed by including reference pictures which have ilp_ref_flag equal to 1 and are included in the RPS for the slice.

An RPS refers to a set of reference pictures associated with a picture and includes all reference pictures preceding the associated picture in decoding order. These reference pictures may be used for inter prediction of the associated picture or a picture following the associated picture in decoding order.

An RPS may include an RPS list. An RPS list may include a list of short-term reference pictures preceding a current picture in POC order, a list of short-term reference pictures following the current picture in POC order, and a list of long-term reference pictures.

A reference picture list may be constructed by including at least one of short-term reference picture(s) preceding the current picture in POC order, short-term reference picture(s) following the current picture in POC order, long-term reference pictures, and inter-layer reference picture(s).

A method of modifying a construction of a reference picture list according to embodiment IV will be described in detail.

In the present embodiment, NumRpsCurrTempList0 represents the number of reference pictures for a current slice in temporal list 0. RefPicListTemp0 represents a list of POCs of reference pictures for a current slice in temporal list 0. NumRpsCurrTempList1 represents the number of reference pictures for a current slice in temporal list 1. RefPicListTemp1 represents a list of POCs of reference pictures for a current slice in temporal list 1. NumPocStCurrBefore represents the number of short-term reference pictures for a current slice whose POCs are smaller than the POC of the current slice. NumPocStCurrAfter represents the number of short-term reference pictures for a current slice whose POCs are greater than the POC of the current slice. NumPocLtCurr represents the number of long-term reference pictures for a current slice. RefPicList0 represents list 0 L0 of reference pictures for a current slice. RefPicList1 represents list 1 L1 of reference pictures for a current slice. ref_pic_list_modification_flag_l0 is information indicating whether RefPicList0 needs modifying. For instance, ref_pic_list_modification_flag_l0 equal to 1 indicates that RefPicList0 needs modifying, and ref_pic_list_modification_flag_l0 equal to 0 indicates that RefPicList0 does not need modifying. ref_pic_list_modification_flag_l1 is information indicating whether RefPicList1 needs modifying. For instance, ref_pic_list_modification_flag_l1 equal to 1 indicates that RefPicList1 needs modifying, and ref_pic_list_modification_flag_l1 equal to 0 indicates that RefPicList1 does not need modifying. IlpRefList is a list of ilp_ref_flag of pictures. IlpRefList [x] is ilp_ref_flag of picture x, and index x may represent the POC of a picture.

A reference picture list according to the present embodiment is constructed as follows.

At the beginning of the decoding process of each slice, a reference picture list RefPicList0 and RefPicList1 for a B picture may be constructed as follows.

A variable NumRpsCurrTempList0 may be set to Max (num_ref_idx_l0_active_minus1+1, NumPocTotalCurr), and a list RefPicListTemp0 may be constructed as in Table 5.

TABLE 5

```
rIdx = 0
while( rIdx < NumRpsCurrTempList0 ) {
    for( i = 0; i < NumPocStCurrBefore && rIdx < NumRpsCurrTempList0; i++ )
        if (ilp_flag == 0 || (ilp_flag == 1 && IlpRefList[RefPicSetStCurrBefore[ i ]]))
            RefPicListTemp0[ rIdx++ ] = RefPicSetStCurrBefore[ i ]
    for( i = 0; i < NumPocStCurrAfter && rIdx < NumRpsCurrTempList0; i++ )
        if (ilp_flag == 0 || (ilp_flag == 1 && IlpRefList[RefPicSetStCurrAfter [ i ]]))
            RefPicListTemp0[ rIdx++ ] = RefPicSetStCurrAfter[ i ]
    for( i = 0; i < NumPocLtCurr && rIdx < NumRpsCurrTempList0; i++ )
        if (ilp_flag == 0 || (ilp_flag == 1 && IlpRefList[RefPicSetLtCurr [ i ]]))
            RefPicListTemp0[ rIdx++ ] = RefPicSetLtCurr[ i ]
}
```

Thus, a reference picture list RefPicList0 may be constructed as in Table 6.

TABLE 6

```
for( rIdx = 0; rIdx <= num_ref_idx_l0_active_minus1; rIdx++)
    RefPicList0[ rIdx ] = ref_pic_list_modification_flag_l0 ?
    RefPicListTemp0[ list_entry_l0[ rIdx ] ] :
                                        RefPicListTemp0[ rIdx ]
```

Meanwhile, when a slice is a B slice, the second reference picture list RefPicList1 may be used. In this case, a variable NumRpsCurrTempList1 may be set to Max (num_ref_idx_l0_active_minus1+1, NumPocTotalCurr), and a list RefPicListTemp1 may be constructed as in Table V.

TABLE 7

```
rIdx = 0
while( rIdx < NumRpsCurrTempList1 ) {
    for( i = 0; i < NumPocStCurrAfter && rIdx < NumRpsCurrTempList1; rIdx++, i++ )
        if (ilp_flag == 0 || (ilp_flag == 1 && IlpRefList[RefPicSetStCurrAfter [ i ]]))
            RefPicListTemp1[ rIdx ] = RefPicSetStCurrAfter[ i ]
    for( i = 0; i < NumPocStCurrBefore && rIdx < NumRpsCurrTempList1; rIdx++, i++ )
        if (ilp_flag == 0 || (ilp_flag == 1 && IlpRefList[RefPicSetStCurrBefore [ i ]]))
            RefPicListTemp1[ rIdx ] = RefPicSetStCurrBefore[ i ]
    for( i = 0; i < NumPocLtCurr && rIdx < NumRpsCurrTempList1; rIdx++, i++ )
        if (ilp_flag == 0 || (ilp_flag == 1 && IlpRefList[RefPicSetLtCurr [ i ]]))
            RefPicListTemp1[ rIdx ] = RefPicSetLtCurr[ i ]
}
```

Thus, when the slice is a B slice, a reference picture list RefPicList1 may be constructed as in Table 8.

TABLE 8

```
for( rIdx = 0; rIdx <= num_ref_idx_l1_active_minus1; rIdx++)
    RefPicList1[ rIdx ] = ref_pic_list_modification_flag_l1 ?
    RefPicListTemp1[ list_entry_l1[ rIdx ] ]:
                                        RefPicListTemp1[ rIdx ]
```

Referring to Tables 5 to 8, the temporal lists (RefPicListTemp0, RefPicListTemp1) are constructed according to ① and ② using ref_flag and ilp_ref_flag. Then, when there is no modification in the reference picture lists (ref_pic_list_modification_flag_lX=0, X=0 or 1), the temporal lists may be the reference picture lists. When there is a modification in the reference picture lists (ref_pic_list_modification_flag_lX=1), the temporal lists modified based on list entry information (list_entry_lx[rIdx], lx=l0 or l1) transmitted from the encoder may be the reference picture lists.

The methods of skipping decoding of a reference picture in a base layer based on signaling (information transmission), a decoding method, memory management, and construction of a reference picture list according to the present invention have been described.

In addition to the foregoing methods, a method of controlling inter-layer prediction in a picture level may be considered in order to perform efficient inter-layer prediction.

In a multilayer bitstream, decoding complexity may be reduced when a non-highest picture or a non-outputted picture is not needed for inter-layer prediction, because these pictures may not be decoded or be removed as described above.

Hereinafter, a method of controlling inter-layer prediction in a picture level will be described based on a signaling method and a decoding method.

Embodiment V. Control of Inter-layer Prediction Based on Signaling Method

Embodiment V-1

In embodiment V-1, ilp_flag and ilp_ref_flag may be transmitted in a slice segment header.

TABLE 9

| slice_segment_header( ) { | Descriptor |
|---|---|
| . . . | |
| ilp_flag | u(1) |
| ilp_ref_flag | u(1) |
| . . . | |
| } | |

As described above, ilp_flag indicates whether a current slice is available for inter-layer prediction. ilp_ref_flag indicates whether the current slice is referred to or used by picture(s) needed for inter-layer prediction among pictures in the same layer.

That is, in the present embodiment, ilp_flag and ilp_ref_flag are transmitted in the slice segment header and indicates whether a slice corresponding to the slice segment header is directly/indirectly used for inter-layer prediction.

The decoder receives ilp_flag and ilp_ref_flag in the slice segment header, and may skip decoding of a target slice in a reference layer or a picture when ilp_flag and ilp_ref_flag indicate that the target slice is not directly/indirectly used in inter-layer prediction of a current block (block to be decoded in a current layer).

Here, the values of ilp_flag and ilp_ref_flag may be controlled in a picture level.

In detail, ilp_flag indicates whether a current coded picture is available for inter-layer prediction, and the value of ilp_flag may be the same in all slice segment headers of the coded picture.

Further, ilp_ref_flag indicates whether the current coded picture is referred to or used by picture(s) needed for inter-layer prediction among pictures in the same layer, and the value of ilp_ref_flag may be the same in all slice segment headers of the coded picture.

In this case, the decoder receives ilp_flag and ilp_ref_flag in the slice segment header, and may skip decoding of a picture including a target slice in a reference layer when ilp_flag and ilp_ref_flag indicate that the target slice is not directly/indirectly used in inter-layer prediction of the current block (block to be decoded in the current layer).

Embodiment V-2

In embodiment V-2, information on inter-layer prediction may be signaled in a slice segment header as in Table 10.

TABLE 10

| slice_segment_header( ) { | Descriptor |
|---|---|
| ... | |
| need_for_ilp_flag | u(1) |
| ... | |
| } | |

In Table 10, need_for_ilp_flag indicates whether a current slice is used for inter-layer prediction, or is used or referred to in inter prediction of other picture(s) needed for inter-layer prediction among pictures in the same layer. That is, when need_for_ilp_flag is equal to 1, a picture indicated by need_for_ilp_flag is directly/indirectly used/referred to in inter prediction. When need_for_ilp_flag is equal to 0, the picture indicated by need_for_ilp_flag is not directly/indirectly used/referred to in inter-layer prediction.

Here, need_for_ilp_flag may further be controlled in a picture level.

In this case, as described above, need_for_ilp_flag indicates whether the current slice is used for inter-layer prediction, or is used or referred to in inter prediction of other picture(s) needed for inter-layer prediction among pictures in the same layer. Here, the value of need_for_ilp_flag is the same in all slice segment headers of a coded picture.

Embodiment VI. Control of Inter-layer Prediction Based On Effect of Decoding Process Embodiment VI-1

In embodiment VI-1, TargetDecLayerIdList is a list of nuh_layer_id values, in which the nuh_layer_id values of NAL units to be decoded are arranged in ascending order. nuh_layer_id is information on an NAL unit level specifying a layer in a multilayer structure. TargetOutputLayerIdList is a list of nuh_layer_id values, in which the nuh_layer_id values of NAL units to be output are arranged in ascending order. HighestTid represents the highest temporal sub-layer to be decoded.

In an example of embodiment VI-1, when the ilp_flag and ilp_ref_flag values of a current picture are false and nu_layer_id of a current NAL unit is not included in TargetOutputLayerIdList, the current picture may be skipped in a decoding process. Thus, the decoder may not decode the current picture when the ilp_flag and ilp_ref_flag values of the current picture are 0 and nuh_layer_id of the current NAL unit is not included in TargetOutputLayerIdList.

In another example of embodiment VI-1, when the ilp_flag and ilp_ref_flag values of a current slice are false and nu_layer_id of a current NAL unit is not included in TargetOutputLayerIdList, the current slice may be skipped in a decoding process. Thus, the decoder may not decode the current slice when the ilp_flag and ilp_ref_flag values of the current slice are 0 and nuh_layer_id of the current NAL unit is not included in TargetOutputLayerIdList.

In still another example of embodiment VI-1, when the ilp_flag and ilp_ref_flag values of a current picture are false and nu_layer_id of a current NAL unit is not included in TargetOutputLayerIdList, the PicOutputFlag value of the current picture may be set to 0. The PicOutputFlag value of the current picture may indicate whether to output the current picture. For example, PicOutputFlag equal to 1 may indicate that the picture is output, and PicOutputFlag equal to 0 may indicate that the picture is not output. Thus, the decoder sets the PicOutputFlag value of the current picture to 0 and may not output the current picture when the ilp_flag and ilp_ref_flag values of the current picture are 0 and nuh_layer_id of the current NAL unit is not included in TargetOutputLayerIdList.

In yet another example of embodiment VI-1, when the ilp_flag and ilp_ref_flag values of a current slice are false and nu_layer_id of a current NAL unit is not included in TargetOutputLayerIdList, the PicOutputFlag value of the current picture may be set to 0. Thus, the decoder sets the PicOutputFlag value of the current picture to 0 and may not output the current picture when the ilp_flag and ilp_ref_flag values of the current slice are 0 and nuh_layer_id of the current NAL unit is not included in TargetOutputLayerIdList.

Embodiment VI-2

In embodiment VI-2, TargetDecLayerIdList is a list of nuh_layer_id values, in which the nuh_layer_id values of NAL units to be decoded are arranged in ascending order. nuh_layer_id is information on an NAL unit header level specifying a layer in a multilayer structure. TargetOutputLayerIdList is a list of nuh_layer_id values, in which the nuh_layer_id values of NAL units to be output are arranged in ascending order. HighestTid represents the highest temporal sub-layer to be decoded.

In an example of embodiment VI-2, when the need_for_ilp_flag value of a current picture is false and nuh_layer_id of a current NAL unit is not included in TargetOutputLayerIdList, the current picture may be skipped in a decoding process. Thus, the decoder may not decode the current picture when the need_for_ilp_flag value of the current picture is 0 and nuh_layer_id of the current NAL unit is not included in TargetOutputLayerIdList.

In another example of embodiment VI-2, when the need_for_ilp_flag value of a current picture is false and nuh_layer_id of a current NAL unit is not included in TargetOutputLayerIdList, a current slice may be skipped in a decoding process. Thus, the decoder may not decode the current slice when the need_for_ilp_flag value of the current picture is 0 and nuh_layer_id of the current NAL unit is not included in TargetOutputLayerIdList.

In still another example of embodiment VI-2, when the need_for_ilp_flag value of a current picture is false and nuh_layer_id of a current NAL unit is not included in TargetOutputLayerIdList, PicOutputFlag of the current picture may be set to 0. The PicOutputFlag value of the current picture may indicate whether to output the current picture. For example, PicOutputFlag equal to 1 may indicate that the picture is output, and PicOutputFlag equal to 0 may indicate that the picture is not output. Thus, the decoder sets the PicOutputFlag value of the current picture to 0 and may not output the current picture when the need_for_ilp_flag value of the current picture is 0 and nuh_layer_id of the current NAL unit is not included in TargetOutputLayerIdList.

In yet another example of embodiment VI-2, when the need_for_ilp_flag value of a current slice is false and nuh_layer_id of a current NAL unit is not included in TargetOutputLayerIdList, PicOutputFlag of a current picture may be set to 0. Thus, the decoder sets the PicOutputFlag value of the current picture to 0 and may not output the current picture when the need_for_ilp_flag value of the current slice is 0 and nuh_layer_id of the current NAL unit is not included in TargetOutputLayerIdList.

The method of controlling decoding of a reference layer through a construction of a reference picture list has been illustrated above, in which the reference picture list may be managed in view of a picture unnecessary for inter-layer prediction.

Hereinafter, a method of managing a reference picture list according to the present invention will be described in detail.

Embodiment VII. Management of Reference Picture List in View of Pictures Unnecessary for Inter-layer Prediction As described above, in a multilayer bitstream, decoding complexity may be reduced when a non-highest picture or a non-outputted picture is not needed for inter-layer prediction, because these pictures may not be decoded or be removed as described above.

The present embodiment illustrates a method of removing a picture unnecessary for prediction of a current picture (current block) or marking the unnecessary picture as "unused for reference" among inter-layer reference pictures included in a reference picture list in detail.

Embodiment VII-1

When information indicating use of inter-layer prediction is transmitted only in a sequence level, Table 11 may be applied.

TABLE 11

| vps_extension( ) { | Descriptor |
|---|---|
| ... | |
|     for( i = 1; i<= vps_max_layers_minus1; i++ ) { | |
|       // layer dependency | |
|       for( j = 0; j <i; j++ ) | |
|         direct_dependency_flag[ i ][ j ] | u(1) |
|     } | |
|     for( i = 0; i <= vps_max_layers_minus1; i++ ) { | |
|       max_sublayer_for_ilp_plus1 [ i ] | u(3) |
| } | |

In Table 11, direct_dependency_flag[i][j] specifies dependency between layers in a multilayer structure. When direct_dependency_flag[i][j] is equal to 0, a layer with an index of j is not a direct reference layer for prediction of a layer with an index of i. When direct_dependency_flag[i][j] is equal to 1, the layer with an index of j may be a direct reference layer for prediction of the layer with an index of i.

In Table 11, max_sublayer_for_ilp_plus1[i] specifies the maximum sub-layer in layer i which may be used/referred to in inter-layer prediction. When max_sublayer_for_ilp_plus1[i] is equal to 0, only a random access point (RAP) picture may be used for inter-layer prediction. When max_sublayer_for_ilp_plus1[i] is greater than 0, pictures with temporalID smaller than or equal to max_sublayer_for_ilp_plus1[i]−1 may be used for inter-layer prediction.

In this case, an inter-layer reference picture in a reference layer with temporalID greater than or equal to max_sublayer_for_ilp_plus1[layer ID of reference layer] is not included in a reference picture set for a current picture. That is, in the present embodiment, a picture in a reference layer with temporalID greater than or equal to temporalID of the maximum sub-layer specified by max_sublayer_for_ilp_plus1[layered of reference layer] is not included in a reference picture list for the current picture.

To this end, a process of reconstructing an inter-layer reference picture set may be modified as follows.

Output from the process of reconstructing the inter-layer reference picture set may be an updated list of inter-layer reference pictures, RefPicSetInterLayer. The list RefPicSetInterLayer is set to be empty at first and may be derived as in Table 12 through the reconstructing process.

TABLE 12

```
for(i=0;i <NumDirectRefLayers[LayerIdInVps[nuh_layer_id]];i++){
  RefPicSetInterLayer[ i ] = the picture with picture order count equal to
PicOrderCnt and nuh_layer_id equal to
RefLayerId[LayerIdInVps[ nuh_layer_id ]] [ i ] but whose TemproalId
is not greater than or equal to
max_sublayer_for_lip_plus1[RefLayerId[ LayerIdInVps
```

TABLE 12-continued

```
[ nuh_layer_id ]][ i ]]
  RefPicSetInterLayer[ i ] is marked as "used for long-term reference"
}
```

After a picture in an upper layer is decoded, picture(s) in the DPB having a lower layer ID than the upper layer and the same POC as the upper layer may be marked as "unused for reference" or removed from the DPB when satisfying the following condition.

<Condition> temporalID of a picture is greater than max_sublayer_for_ilp_plus1[refLayerId [LayerIdInVps [Nuh_layer_id]][i]].

The foregoing condition may also be applied as follows: temporalID of a picture is greater than temporalID of the maximum sub-layer specified by max_sublayer_for_ilp_plus1.

In this case, the decoder may remove the picture from the DPB or marks the picture as "unused for reference" so that the picture is not referred to in inter-layer prediction. The picture removed from the DPB or marked as "unused for reference" is not included in a reference picture list used for inter-layer prediction.

Embodiment VII-2

In an example of various methods for indicating whether a picture is needed for inter-layer prediction, two pieces of information, for example, ilp_flag and ilp_ref_flag, may be used.

Table 13 illustrates an example of signaling ilp_flag and ilp_ref_flag in a slice segment header.

TABLE 13

| slice_segment_header( ) { | Descriptor |
|---|---|
| ... | |
|     ilp_flag | u(1) |
|     ilp_ref_flag | u(1) |
|     ... | |
| } | |

In Table 13, ilp_flag indicates whether a current coded picture is available for inter-layer prediction. ilp_ref_flag indicates whether the current coded picture is referred to or used by picture(s) needed for inter-layer prediction among pictures in the same layer.

Here, when ilp_flag is equal to 0, a picture indicated by ilp_flag is not referred to/used in inter-layer prediction and thus is not included in a list of inter-layer reference pictures for the current picture.

To this end, a process of reconstructing an inter-layer reference picture set may be modified as follows.

Output from the process of reconstructing the inter-layer reference picture set may be an updated list of inter-layer reference pictures, RefPicSetInterLayer. The list RefPicSetInterLayer is set to be empty at first and may be derived as in Table 14 through the reconstructing process.

TABLE 14

```
for( i = 0; i < NumDirectRefLayers[ LayerIdInVps[ nuh_layer_id ] ];
i++ ) {
  RefPicSetInterLayer[ i ] = the picture with picture order count equal to
PicOrderCnt and nuh_layer_id equal to
RefLayerId[ LayerIdInVps[ nuh_layer_id ]][ i ] and whose ilp_flag
is equal to 1
  RefPicSetInterLayer[ i ] is marked as "used for long-term reference"
}
```

When the two pieces of information are used to indicate inter-layer prediction, after a picture in an upper layer is decoded, picture(s) in the DPB having a lower layer ID than the upper layer and the same POC as the upper layer may be marked as "unused for reference" or removed from the DPB when satisfying the following condition.

<Condition> ilp_flag is equal to 0 and ilp_ref_flag is equal to 0, or ilp_flag equal to 1 and ilp_ref_flag is equal to 0.

Thus, when ilp_ref_flag is equal to 0, the decoder may mark the picture indicated by ilp_ref_flag as "unused for reference" or remove the picture from the DPB so that the picture is not referred to/used in inter-layer prediction. The picture removed from the DPB or marked as "unused for reference" is not included in a reference picture list used for inter-layer prediction.

Meanwhile, only one piece of information (need_for_ilp_flag) may be used, instead of two pieces of information (ilp_flag and ilp_ref_flag), to indicate whether a picture is necessary for inter-layer prediction.

Table 15 illustrates an example of signaling need_for_ilp_flag in a slice segment header.

TABLE 15

| slice_segment_header( ) { | Descriptor |
|---|---|
| ... | |
| need_for_ilp_flag | u(1) |
| ... | |
| } | |

In Table 15, need_for_ilp_flag indicates whether a current slice is used for inter-layer prediction or is referred to or used in interlayer prediction of other picture(s) needed for inter-layer prediction among pictures in the same layer. That is, when need_for_ilp_flag is equal to 1, a picture indicated by need_for_ilp_flag is directly/indirectly used/referred to in inter-layer prediction. When need_for_ilp_flag is equal to 0, the picture indicated by need_for_ilp_flag is not directly/indirectly used/referred to in inter-layer prediction.

Thus, when need_for_ilp_flag is equal to 0, the picture indicated by need_for_ilp_flag is not referred to/used in inter-layer prediction and thus is not included in a list of inter-layer reference pictures for the current picture.

To this end, a process of reconstructing an inter-layer reference picture set may be modified as follows.

Output from the process of reconstructing the inter-layer reference picture set may be an updated list of inter-layer reference pictures, RefPicSetInterLayer. The list RefPicSetInterLayer is set to be empty at first and may be derived as in Table 16 through the reconstructing process.

TABLE 16 for( i = 0; i < NumDirectRefLayers[ LayerIdInVps[ nuh_layer_id ] ]; i++ ) {
  RefPicSetInterLayer[ i ] = the picture with picture order count equal to PicOrderCnt and nuh_layer_id equal to RefLayerId[ LayerIdInVps[ nuh_layer_id ]][ i ] and whose need_for_ilp_flag is equal to 1
  RefPicSetInterLayer[ i ] is marked as "used for long-term reference"
}

Thus, when one piece of information (need_for_ilp_flag) is used to indicate inter-layer prediction, after a picture in an upper layer is decoded, picture(s) in the DPB having a lower layer ID than the upper layer and the same POC as the upper layer may be marked as "unused for reference" or removed from the DPB when satisfying the following condition.

<Condition> need_for_ilp_flag is equal to 0

Thus, when need_for_ilp_flag is equal to 0, the decoder may mark the picture indicated by need_for_ilp_flag as "unused for reference" or remove the picture from the DPB so that the picture is not referred to/used in inter-layer prediction. The picture removed from the DPB or marked as "unused for reference" is not included in a reference picture list used for inter-layer prediction.

Embodiment VII-3

In embodiment VII-3, both signaling in a sequence level and signaling in a picture level may be used.

In an example of embodiment VII-3, a process of reconstructing an inter-layer reference picture set may be modified as follows.

Output from the process of reconstructing the inter-layer reference picture set may be an updated list of inter-layer reference pictures, RefPicSetInterLayer. The list RefPicSetInterLayer is set to be empty at first and may be derived as in Table 17 through the reconstructing process.

TABLE 17 for( i = 0; i < NumDirectRefLayers[ LayerIdInVps[ nuh_layer_id ] ]; i++ ) {
  RefPicSetInterLayer[ i ] = the picture with picture order count equal to PicOrderCnt and nuh_layer_id equal to RefLayerId[ LayerIdInVps[ nuh_layer_id ]][ i ] and whose ilp_flag is equal to 1 but whose TemporalId is not greater than or equal to max_sublayer_for_ilp_plus1[RefLayerId[ LayerIdInVps [ nuh_layer_id ]][ i ]]
  RefPicSetInterLayer[ i ] is marked as "used for long-term reference"
}

In an example where Table 17 is applied, after a picture in an upper layer is decoded, picture(s) in the DPB having a lower layer ID than the upper layer and the same POC as the upper layer may be marked as "unused for reference" or removed from the DPB when satisfying the following condition.

<Condition>(1) temporalID of a picture is greater than max_sublayer_for_ilp_plus1[refLayerId [LayerIdInVps [Nuh_layer_id]][i]], (2) ilp_flag is equal to 0 and ilp_ref_flag is equal to 0, or (3) ilp_flag is equal to 1 and ilp_ref_flag is equal to 0. Here, (1) may be replaced by a condition that temporalID of a picture is greater than temporalID of the maximum sub-layer specified by max_sublayer_for_ilp_plus1, (2) and (3) may be replaced by a condition that need_for_ilp_flag is equal to 0.

According to another example of embodiment VII-3, Table 17 illustrating the process of reconstructing the inter-layer reference picture set may be replaced by Table 18.

Output from the process of reconstructing the inter-layer reference picture set may be an updated list of inter-layer reference pictures, RefPicSetInterLayer. The list RefPicSetInterLayer is set to be empty at first and may be derived as in Table 18 through the reconstructing process.

TABLE 18 for( i = 0; i < NumDirectRefLayers[ LayerIdInVps[ nuh_layer_id ] ]; i++ ) {
  RefPicSetInterLayer[ i ] = the picture with picture order count equal to PicOrderCnt and nuh_layer_id equal to RefLayerId[ LayerIdInVps[ nuh_layer_id ]][ i ] and whose ilp_flag is equal to 1 but whose TemporalId is not greater than or equal to max_sublayer_for_ilp_plus1[RefLayerId[ LayerIdInVps [ nuh_layer_id ]][ i ]]

TABLE 18-continued

RefPicSetInterLayer[ i ] is marked as "used for long-term reference"
}

Figure 9:
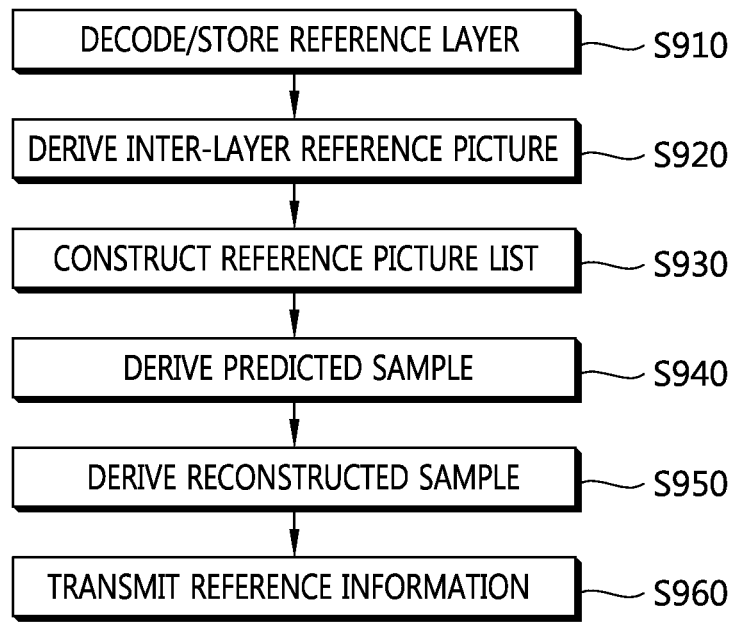
FIG. 9 is a flowchart schematically illustrating an example of an operation of a video encoder according to the present invention.

FIG. 9 is a flowchart schematically illustrating an example of an operation of a video encoder according to the present invention.

Referring to FIG. 9, the encoder may decode and store a picture in a reference layer (S910). In scalable video coding which supports a multilayer structure, the encoder may decode the picture in the reference layer and store the decoded picture in a decoded picture buffer (DPB). The decoded picture in the reference layer may be a picture belonging to the same AU as a picture to be decoded in a current layer.

When the picture in the reference layer is neither referred to in prediction of a current block nor referred to in prediction of another picture in the reference layer which is referred to in prediction of the current block, the encoder may mark the picture in the reference layer as unused for reference.

In this case, the encoder may transmit information on the picture neither referred to in prediction of the current block nor referred to in prediction of the other picture in the reference layer which is referred to in prediction of the current block to a decoder through reference information (for example, ilp_flag, ilp_ref_flag, need_for_ilp_flag emd), which will be described.

The encoder may decode or store the picture not marked as unused for reference. Alternatively, the encoder may remove the picture marked as unused for reference from a memory.

The encoder may derive an inter-layer reference picture for prediction of the current block (S920). The encoder may derive a reference picture (inter-layer reference picture) for a block to be decoded (current block) of a current picture in the current layer from the picture in the reference layer. In this case, the encoder may derive the inter-layer reference picture by performing sampling in view of a phase and resolution.

The encoder may derive the inter-layer reference picture based on pictures which are available for reference in prediction of the current block or available for reference in prediction of another picture in the reference layer referred to in prediction of the current block.

Here, the information specifying the picture neither referred to in prediction of the current block nor referred to in prediction of another picture in the reference layer which is referred to in prediction of the current block may be transmitted to the decoder through the reference information (for example, ilp_flag, ilp_ref_flag, need_for_ilp_flag emd), which will be described.

The encoder may construct a reference picture list used for prediction of the current block (S930). The reference picture list may be reference picture list L0, or reference picture list L0 and reference picture list L1 depending on a current slice (slice to be decoded).

The reference picture list may include pictures in the same layer (current layer) as the current picture and a reference picture (inter-layer reference picture) derived from a reference layer different from the current layer. Here, the reference picture list may include a single inter-layer reference picture derived from a single reference layer or two or more inter-layer reference pictures derived from two or more reference layers.

The encoder may derive a predicted sample of the current block based on the reference picture list (S940). The encoder may perform inter prediction on the current block using at least one of the pictures in the reference picture list. For instance, the encoder may predict the current block using the inter-layer reference picture derived from the reference layer.

The encoder may derive a reconstructed sample based on the predicted sample (S950). The encoder may derive the reconstructed sample by adding the predicted sample and a residual signal. The encoder may derive the reconstructed sample by the current block or current picture.

The encoder may transmit the reference information (S960). The encoder may transmit information on a picture in the reference layer available for inter-layer prediction through the reference information. For instance, when a picture in the reference layer is available for reference in prediction of the current block or available for reference in prediction of another picture in the reference layer which is referred to in prediction of the current block, the reference information may indicate that the picture in the reference layer is available for reference in inter-layer prediction. Alternatively, when a picture in the reference layer is neither referred to in prediction of the current block nor referred to in prediction of another picture in the reference layer which is referred to in prediction of the current block, the reference information may indicate that the picture in the reference layer is not referred to in inter-layer prediction.

The encoder may transmit the reference information for the current picture in a slice segment header. Alternatively, the encoder may transmit the reference information for the current picture in a picture level.

In transmitting information, the encoder may transmit residual information that is a difference between an original signal and a predicted signal in addition to the reference information.

Although encoding including prediction of the current block in the multilayer structure has been described, the present invention is not limited thereto. Details of encoding may include all technical features described in the present specification.

Figure 10:
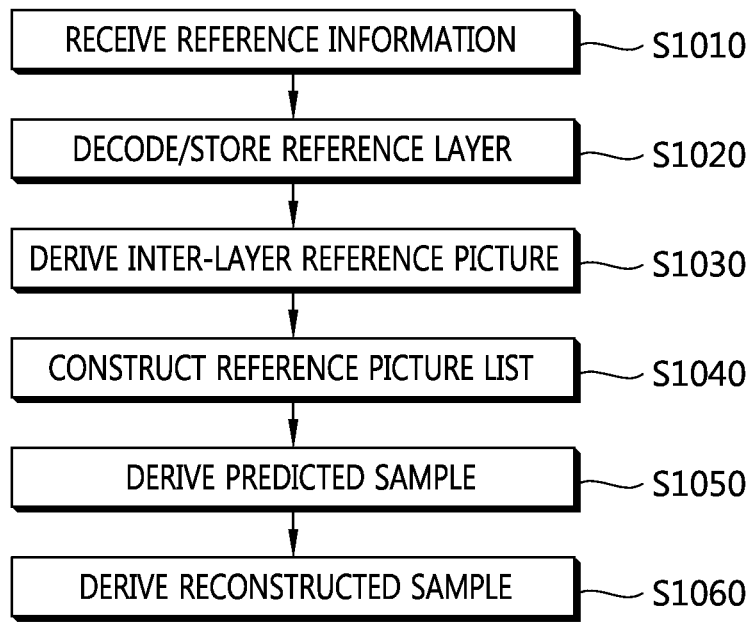
FIG. 10 is a flowchart schematically illustrating an example of an operation of a video decoder according to the present invention.

FIG. 10 is a flowchart schematically illustrating an example of an operation of a video decoder according to the present invention.

Referring to FIG. 10, the decoder may receive reference information (S1010). The decoder may receive, from an encoder, the reference information indicating whether a picture in a reference layer is available for inter-layer prediction.

For example, when the picture in the reference layer is available for reference in prediction of a current block or available for reference in prediction of another picture in the reference layer which is referred to in prediction of the current block, the reference information may indicate that the picture in the reference layer is available for inter-layer prediction.

Alternatively, when the picture in the reference layer is neither referred to in prediction of the current block nor referred to in prediction of another picture in the reference layer which is referred to in prediction of the current block, the reference information may indicate that the picture in the reference layer is not used in inter-layer prediction.

The decoder may decode and store the picture in the reference layer (S1020). The decoder may mark the picture, indicated to be unavailable for inter-layer prediction by the reference information, as "unused for reference."

The decoder may decode or store the picture not marked as unused for reference. Alternatively, the decoder may remove the picture marked as unused for reference from a memory (for example, DPB).

The decoder may derive an inter-layer reference picture referred to in prediction of the current block (S1030). The decoder may derive the inter-layer reference picture referred to in prediction of the current block in a current layer from the decoded picture in the reference layer.

For example, the decoder may derive the inter-layer reference picture based on pictures indicated by the reference information to be available for inter-layer prediction among pictures in the reference layer. Here, the decoder may derive a single inter-layer reference picture from a single reference layer or a plurality of inter-layer reference pictures derived from a plurality of reference layers.

Here, when the picture, indicated by the reference information to be unavailable for inter-layer prediction, is marked as "unused for reference" in operation S1020, the decoder may derive the inter-layer reference picture from the picture in the reference layer which is not marked as unused for reference.

In addition, when the picture, indicated by the reference information to be unavailable for inter-layer prediction, is marked as "unused for reference" in operation S1020 and the marked picture is removed from the memory, the decoder may derive the inter-layer reference picture from a picture in the reference layer which remains in the memory.

Furthermore, the decoder may derive an inter-layer reference picture from the picture indicated by the reference information to be available for inter-layer prediction in the layer indicated to be available for inter-layer prediction by the current picture.

Here, the decoder may derive the inter-layer reference picture from a picture belonging to the same AU as the current picture among the pictures in the reference layer.

The decoder may derive a reference picture list to be used for inter prediction of the current block (S1040). The decoder may construct a reference picture list including the inter-layer reference picture and a reference picture in the current layer.

The reference picture list may be reference picture list L0, or reference picture list L0 and reference picture list L1 depending on a current slice (slice to be decoded).

The reference picture list may include pictures in the same layer (current layer) as the current picture and a reference picture (inter-layer reference picture) derived from a reference layer different from the current layer. Here, the reference picture list may include a single inter-layer reference picture derived from a single reference layer or two or more inter-layer reference pictures derived from two or more reference layers.

The decoder may derive a predicted sample of the current block (S1050). The decoder may derive the predicted sample of the current block by predicting the current block in the current layer based on the reference picture list.

The decoder may derive a reconstructed sample based on the predicted sample (S1060). The decoder may derive the reconstructed sample by adding the predicted sample and a residual signal. The decoder may derive the reconstructed sample by the current block unit or current picture unit.

In the present specification, the terms "base layer" and "spatial base layer" are used in a mixed manner and the terms "enhancement layer" and "spatial enhancement layer" are used in a mixed manner, which is for convenience of description. The embodiments of the present invention are not limited to the spatial base layer and the spatial enhancement layer. A spatial base layer is used as an example of a case where resolution is applied as scalability of a base layer, and a spatial enhancement layer is used as an example of a case where resolution is applied as scalability of an enhancement layer. It should be noted that the embodiments of the present invention may be applied in the same manner to various scalabilities illustrated above (view, bit rate, frame rate, or the like) in addition to resolution.

In the present specification, the expressions "referred to in inter(-layer) prediction," "used in or for inter(-layer) prediction," and "needed for inter(-layer) prediction" are used in a mixed manner for convenience of description. These expressions are neither contradictory nor exclusive expressions but may refer to the same meaning. In addition, a relationship of inclusion may be established between these expressions. In detail, the expressions "being used in or for inter-layer prediction" and "being needed for inter-layer prediction" may include the expression "being referred to in prediction of a direct reference picture for prediction of a picture (block) to be predicted."

Generality of NAL unit header and slice segment header
Use: Including indirect reference While the methods in the above-mentioned exemplary system have been described on the basis of flowcharts including a series of steps or blocks, the invention is not limited to the order of steps and a certain step may be performed in a step or an order other than described above or at the same time as described above. Since the above-mentioned embodiments may include various examples, combinations of embodiments may also be understood as an embodiment. Therefore, the invention includes all substitutions, corrections, and modifications belonging to the appended claims.

The invention claimed is:

1. A video decoding method by a video decoder, comprising:
    receiving flag information for whether a picture in a reference layer is not used for an inter-layer prediction;
    decoding and storing pictures in the reference layer;
    deriving an inter-layer reference picture for a current block from at least one of the decoded pictures in the reference layer based on the flag information;
    constructing a reference picture list comprising the inter-layer reference picture in the reference layer and a reference picture in the current layer;
    deriving a predicted sample of the current block in the current layer based on the inter-layer reference picture comprised in the reference picture list;
    deriving a reconstructed picture based on the predicted sample and a residual sample of the current block; and
    performing deblocking filtering on the reconstructed picture,
    wherein when the flag information indicates that a specific picture in the reference layer is not used for the inter-layer prediction, the specific picture is not comprised in the inter-layer reference picture set, and
    wherein the flag information is received through a slice segment header, and in all slice segment header of the picture in the reference layer, a value of the flag information is set to the same.

2. The method of claim 1, wherein when the flag information indicates that the specific picture in the reference layer is not used for the inter-layer prediction, decoding of the specific picture is ignored or skipped without affecting decoding of other pictures in the current layer.

3. The method of claim 1, wherein the value of the flag information is equal to one of 0 and 1.

4. The method of claim 1, wherein when the flag information indicates that the specific picture in the reference layer is not used for the inter-layer prediction, the specific picture in the reference layer is marked as unused for reference.

5. The method of claim 1, wherein the inter-layer reference picture is derived based on pictures indicated by the flag information to be used for inter-layer prediction among pictures in the reference layer.

6. The method of claim 5, wherein the specific picture in the reference layer indicated by the flag information not used for the inter-layer prediction is marked as unused for reference, and the inter-layer reference picture is derived from pictures which are not marked as unused for reference.

7. A video encoding method by a video encoder, comprising:
   encoding pictures in a reference layer;
   decoding and storing the pictures in the reference layer;
   deriving an inter-layer reference picture for a current block from at least one of the decoded pictures in the reference layer;
   constructing a reference picture list comprising the inter-layer reference picture in the reference layer and a reference picture in the current layer;
   deriving a predicted sample of a current block in a current layer based on the reference picture list;
   deriving a residual sample of the current block based on the predicted sample and an original sample of the current block;
   generating residual information for the residual sample of the current block;
   generating flag information for whether a picture in the reference layer is not used for the inter-layer prediction; and
   generating a bitstream including the residual information and the flag information,
   wherein when the flag information indicate that a specific picture in the reference layer is not used for the inter-layer prediction, the specific picture is not comprised in the reference picture set, and
   wherein the flag information is transmitted through a slice segment header, and in all slice segment header of the picture in the reference layer, a value of the flag information is set to the same.

8. The method of claim 7, wherein when the flag information indicates that the specific picture in the reference layer is not used for the inter-layer prediction, decoding of the specific picture can be ignored or skipped without affecting decoding of other pictures in the current layer.

9. The method of claim 7, wherein the value of the flag information is equal to one of 0 and 1.

10. The method of claim 7, wherein when the specific picture in the reference layer is not referred to in prediction of the current block and is not referred to in prediction of another picture in the reference layer which is referred to in prediction of the current block, the specific picture in the reference layer is marked as unused for reference, and the flag information comprises information specifying the specific picture which is not referred to in prediction of the current block and is not referred to in prediction of another picture in the reference layer that is referred to in prediction of the current block.

11. A non-transitory computer-readable storage medium storing a bitstream comprising: residual information for a residual sample derived based on a predicted sample and an original sample of a current block; flag information for whether a picture in a reference layer is not used for an inter-layer prediction of the current block,
   wherein when the flag information indicate that a specific picture in the reference layer is not used for the inter-layer prediction, the specific picture is not comprised in a reference picture set, and
   wherein the flag information is received through a slice segment header, and in all slice segment header of the picture in the reference layer, a value of the flag information is set to the same.

* * * * *